US012153130B2

(12) United States Patent
Parker et al.

(10) Patent No.: US 12,153,130 B2
(45) Date of Patent: Nov. 26, 2024

(54) FINE-TUNING THE H-SCAN FOR VISUALIZING TYPES OF TISSUE SCATTERERS

(71) Applicant: University of Rochester, Rochester, NY (US)

(72) Inventors: Kevin J. Parker, Rochester, NY (US); Jihye Baek, Rochester, NY (US)

(73) Assignee: University of Rochester, Rochester, NY (US)

( * ) Notice: Subject to any disclaimer, the term of this patent is extended or adjusted under 35 U.S.C. 154(b) by 1354 days.

(21) Appl. No.: 16/742,084

(22) Filed: Jan. 14, 2020

(65) Prior Publication Data

US 2020/0225347 A1 Jul. 16, 2020

Related U.S. Application Data

(63) Continuation-in-part of application No. 15/364,581, filed on Nov. 30, 2016, now Pat. No. 10,890,661.

(60) Provisional application No. 62/265,185, filed on Dec. 9, 2015.

(51) Int. Cl.
*G01S 15/89* (2006.01)
*G01S 7/52* (2006.01)
*G06T 11/00* (2006.01)

(52) U.S. Cl.
CPC ...... *G01S 15/8977* (2013.01); *G01S 7/52071* (2013.01); *G06T 11/001* (2013.01)

(58) Field of Classification Search
CPC . G01S 15/8977; G01S 7/52071; G06T 1/001; A61B 8/48; A61B 8/5207
See application file for complete search history.

(56) References Cited

U.S. PATENT DOCUMENTS 5,255,683 A  10/1993  Monaghan

OTHER PUBLICATIONS

Czerwinski, R.N., D.L. Jones, and W.D. O'Brien. Detection of Lines and Boundaries in Speckle Images-Application to Medical Ultrasound.â IEEE transactions on medical imaging 18.2 (1999): 126-136. Web. (Year: 1999).*
Czerwinski, R.N., D.L. Jones, and W.D. O'Brien. "Line and Boundary Detection in Speckle Images." IEEE transactions on image processing 7.12 (1998): 1700-1714. Web. (Year: 1998).*
Campbell J C and Waag R C 1983 Normalization of ultrasonic scattering measurements to obtain average differential scattering cross sections for tissues J Acoust Soc Am 74 393-9.

(Continued)

*Primary Examiner* — Colin T. Sakamoto
*Assistant Examiner* — Tommy T Ly
(74) *Attorney, Agent, or Firm* — Ping Wang; Kalos Athena Wang PLLC

(57) ABSTRACT

A method of forming an image of a region of interest using a pulse-echo imaging device is described. The method includes the steps of generating a pulse using the pulse-echo imaging device, causing the pulse to be incident on the region of interest to generate a reflected echo, receiving the reflected echo in the pulse-echo imaging device, comparing a measure of frequency content of the reflected echo to the transmitted pulse, and frequency shifted replicas of the transmitted pulse, wherein each is associated with a unique label, selecting a label based on the comparison, and generating an image incorporating the selected label.

1 Claim, 33 Drawing Sheets

(25 of 33 Drawing Sheet(s) Filed in Color)

(56) References Cited

OTHER PUBLICATIONS

Jensen J A 1996 Field: a program for simulating ultrasound systems. In: 10th Nordibaltic Conference on 9 Biomedical Imaging, pp. 351-353.
Lerner R M and Waag R C 1988 Wave space interpretation of scattered ultrasound Ultrasound Med Biol 14 97-102.
Office Action dated Nov. 27, 2019 for U.S. Appl. No. 15/364,581 (pp. 1-9).
Waag R C 1984 A review of tissue characterization from ultrasonic scattering IEEE Trans Biomed Eng 31 884-93.
Waag R C, Lee P P K, Persson H W, Schenk E A and Gramiak R 1982 Frequency Idependent angle scattering of ultrasound by liver J Acoust Soc Am 72 343-52.

* cited by examiner

FIG. 7

FIG. 17A
FIG. 17B
FIG. 17C
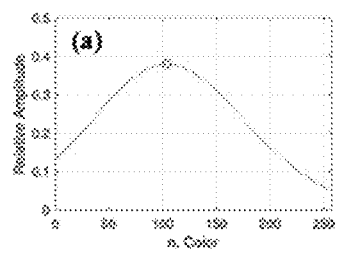
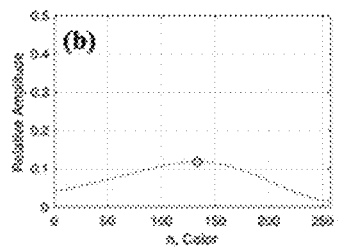
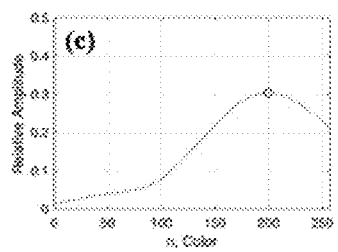

FINE-TUNING THE H-SCAN FOR VISUALIZING TYPES OF TISSUE SCATTERERS

CROSS-REFERENCE TO RELATED APPLICATIONS

This application is a continuation-in-part of U.S. patent application Ser. No. 15/364,581 filed on Nov. 30, 2016, which claims priority to U.S. provisional application No. 62/265,185 filed on Dec. 9, 2015, both of which are incorporated herein by reference in their entireties.

STATEMENT REGARDING FEDERALLY SPONSORED RESEARCH OR DEVELOPMENT

This invention was made with government support under grant R21EB025290 awarded by National Institutes of Health. The government has certain rights in the invention.

BACKGROUND

Generally, pulse-echo systems such as sonar, radar, ultrasound and other types of imaging systems generate a pulse, causing the pulse to be incident on a region of interest. The pulse then generates a reflected echo off of the region of interest, and the reflected echo is received back at the pulse-echo device. While pulse-echo systems conventionally generate greyscale images, there are other characteristics that could be obtained. However to obtain additional characteristics, improved systems and methods for properly discriminating an echo of the pulse are required.

The H-scan approach is a matched filter methodology that aims to add information to the traditional ultrasound B-scan. The theory is based on the differences in the echoes produced by different classes of reflectors or scatterers. Matched filters can be created for different types of scatterers, whereby the maximum output indicates a match and color schemes can be used to indicate the class of scatterer responsible for echoes, providing a visual interpretation of the results. However, within the theory of weak scattering from a variety of shapes, small changes in the size of the inhomogeneous objects will create shifts in the scattering transfer function.

The mathematical treatment of scattering of light and sound has a rich history spanning over 100 years. The scattering of ultrasound from tissues forms the basis for the worldwide use of ultrasound imaging for diagnostic purposes, and an uncountable number of these images are obtained every day. It is generally understood that inhomogeneities within tissues, specifically localized changes in acoustic impedance or density and compressibility, are responsible for the echoes that are captured by imaging systems. A longstanding goal within the research community has been to supplement the traditional B-scan image of tissue with additional quantitative information about the scatterers, linked to the structure or size or statistical properties of the underlying tissue and cellular structures.

Thus, what is needed in the art is a scattering and reflection identification system and method for identifying and discriminating echoes of a pulse. Further, methods for fine-tuning the h-scan for visualizing types of tissue scatterers would be an improvement in the art.

Throughout the present disclosure, reference will be made to the following references, which are hereby incorporated by reference in their entireties:

Abramowitz M and Stegun I A 1964 United States. National Bureau of Standards. Applied mathematics series, (Washington,: U.S. Govt. Print. Off.) pp 780-1.

Ahmed R, Ye J, Gerber S A and Doyely M M in press Preclinical imaging using single track location shear wave elastography: monitoring the progression of murine pancreatic tumor liver metastasis in vivo *IEEE Trans Med Imaging*.

Astheimer J P and Parker K J 2018 Concentric layered Hermite scatterers *Phys Lett A* 382 1379-82.

Bamber J C and Dickinson R J 1980 Ultrasonic B-scanning: a computer simulation *Phys Med Biol* 25 463-79.

Born M and Wolf E 1980 *Principles of optics: electromagnetic theory of propagation, interference and diffraction of light* (Oxford; New York: Pergamon Press).

Bracewell R N 1965 *The Fourier transform and its applications*, Chapter 12 (New York: McGraw-Hill).

Bracewell R N 1986 McGraw-Hill series in electrical engineering. Circuits and systems, (New York: McGraw-Hill) p 117.

Campbell J C and Waag R C 1983 Normalization of ultrasonic scattering measurements to obtain average differential scattering cross sections for tissues *J Acoust Soc Am* 74 393-9.

Campbell J A and Waag R C 1984 Measurements of calf liver ultrasonic differential and total scattering cross sections *J Acoust Soc Am* 75 603-11.

Cloostermans M J T M and Thijssen J M 1983 A beam corrected estimation of the frequency dependent attenuation of biological tissues from backscattered ultrasound *Ultrason Imaging* 5 136-47.

Cobbold R S C 2007 Biomedical engineering series, (New York: Oxford University Press) p 305.

Debye P and Bueche A M 1949 Scattering by an inhomogeneous solid *J Appl Phys* 20 518-25.

Erdélyi A and Bateman H 1954 *Tables of integral transforms*. vol. 2 (McGraw-Hill: New York).

Faran Jr. J J 1951 Sound scattering by solid cylinders and spheres *J Acoust Soc Am* 23 405-18.

Fujii Y, Taniguchi N, Itoh K, Shigeta K, Wang Y, Tsao J W, Kumasaki K and Itoh T 2002 A new method for attenuation coefficient measurement in the liver: comparison with the spectral shift central frequency method *J Ultrasound Med* 21 783-8.

Garra B S, Insana M F, Shawker T H and Russell M A 1987 Quantitative estimation of liver attenuation and echogenicity: normal state versus diffuse liver disease *Radiology* 162 61-7.

Ge G R, Laimes R, Pinto J, Guerrero J, Chavez H, Salazar C, Lavarello R J and Parker K J 2018 H-scan analysis of thyroid lesions *J Med Imaging* 5 013505.

Girault J M, Ossant F, Ouahabi A, Kouame D and Patat F 1998 Time-varying autoregressive spectral estimation for ultrasound attenuation in tissue characterization *IEEE Trans Ultrason Ferroelectr Freq Control* 45 650-9.

Gore J C and Leeman S 1977 Ultrasonic backscattering from human tissue: a realistic model *Phys Med Biol* 22 317-26.

Han B J, Ruffolo L I, Jackson K M, Belt B A, Figueroa N, Murphy J D, Linehan D and Prieto P A 2019 Investigating the tumor-immune microenvironment in an autochthonous murine model of cholangiocarcinoma *Journal of clinical oncology: official journal of the American Society of Clinical Oncology* 37 53.

Insana M F and Brown D G 1993 *Ultrasonic scattering in biological tissues*, ed K K Shung and G A Thieme (Boca Raton: CRC Press) pp 75-124.

Insana M F, Wagner R F, Brown D G and Hall T J 1990 Describing small-scale structure in random media using pulse-echo ultrasound *J Acoust Soc Am* 87 179-92.

Jensen J A 1996 Field: a program for simulating ultrasound systems. In: 10th Nordibaltic Conference on Biomedical Imaging, pp 351-355.

Khairalseed M, Brown K, Parker K J and Hoyt K 2019a Real-time H-scan ultrasound imaging using a Verasonics research scanner *Ultrasonics* 94 28-36.

Khairalseed M, Hoyt K, Ormachea J, Terrazas A and Parker K J 2017 H-scan sensitivity to scattering size *J Med Imaging* 4 043501.

Khairalseed M, Javed K, Jashkaran G, Kim J W, Parker K J and Hoyt K 2019b Monitoring early breast cancer response to neoadjuvant therapy using H-scan ultrasound imaging: preliminary preclinical results *J Ultrasound Med* 38 1259-68.

Kuc R 1984 Estimating acoustic attenuation from reflected ultrasound signals: Comparison of spectral-shift and spectral-difference approaches *IEEE Trans Acoust Speech* 32 1-6.

Lathi B P 1983 HRW series in electrical and computer engineering, (New York: Holt Rinehart and Winston) p 500.

Lee D Y, Yoo Y, Song T K and Chang J H 2012 Adaptive dynamic quadrature demodulation with autoregressive spectral estimation in ultrasound imaging *Biomed Signal Proces* 7 371-8.

Lerner R M and Waag R C 1988 Wave space interpretation of scattered ultrasound *Ultrasound Med Biol* 14 97-102.

Macovski A 1983 *Basic Ultrasonic Imaging* (Englewood Cliffs, N.J.: Prentice-Hall).

Macovski A 1983 Medical Imaging Systems, (Englewood Cliffs, N.J.: Prentice-Hall) pp 173-203.

Maklad N F, Ophir J and Balsara V 1984 Attenuation of ultrasound in normal liver and diffuse liver disease in vivo *Ultrason Imaging* 6 117-25.

Montaldo G, Tanter M, Bercoff J, Benech N and Fink M 2009 Coherent plane-wave compounding for very high frame rate ultrasonography and transient elastography *IEEE Trans Ultrason Ferroelectr Freq Control* 56 489-506.

Morse P M and Ingard K U 1987 (Princeton, NJ: Princeton University Press) pp 400-66.

Parker K J 1983 Ultrasonic attenuation and absorption in liver tissue *Ultrasound Med Biol* 9 363-9.

Parker K J 1986 Attenuation measurement uncertainties caused by speckle statistics *J Acoust Soc Am* 80 727-34.

Parker K J 2016a The H-scan format for classification of ultrasound scattering *J OMICS Radiol* 5 1000236.

Parker K J 2016b Scattering and reflection identification in H-scan images *Phys Med Biol* 61 L20-8.

Parker K J 2016c Scattering and reflection identification in H-scan images *Phys Med Biol* 61 L20.

Parker K J 2017 Herm ite scatterers in an ultraviolet sky *Phys Lett A* 381 3845-8.

Parker K J 2019a The first order statistics of backscatter from the fractal branching vasculature. In: *arXiv e-prints*, 1906.02603 [q-bio.QM].

Parker K J 2019b Shapes and distributions of soft tissue scatterers *Phys Med Biol* 64 175022.

Parker K J, Carroll-Nellenback J J and Wood R W 2019 The 3D spatial autocorrelation of the branching fractal vasculature *Acoustics* 1 369-81.

Parker K J, Lerner R M and Waag R C 1984 Attenuation of ultrasound: magnitude and frequency dependence for tissue characterization *Radiology* 153 785-8.

Parker K J and Tuthill T A 1986 Carbon tetrachloride induced changes in ultrasonic properties of liver *IEEE Trans Biomed Eng* 33 453-60.

Parker K J, Tuthill T A and Baggs R B 1988 The role of glycogen and phosphate in ultrasonic attenuation of liver *J Acoust Soc Am* 83 374-8.

Parker K J and Waag R C 1983 Measurement of ultrasonic attenuation within regions selected from B-Scan images *IEEE Trans Biomed Eng* BME-30 431-7.

Poularikas A D 2010 The electrical engineering handbook series, (Boca Raton: CRC Press) p 7.21.

Poularikas A D 2010 *Transforms and applications handbook, Chapter 7* (Boca Raton: CRC Press).

Prince J L and Links J M 2015 *Medical imaging signals and systems* (Boston: Pearson).

Proakis J G 2001 Digital communications, Fourth edition, (New York: Irwin/McGraw-Hill) chapter 4.

Rayleigh L 1918 On the scattering of light spherical shells, and by complete spheres of periodic structure, when the refractivity is small *Proceedings of the Royal Society of London. Series A* 94 296-300.

Soares K C, Foley K, Olino K, Leubner A, Mayo S C, Jain A, Jaffee E, Schulick R D, Yoshimura K, Edil B and Zheng L 2014 A preclinical murine model of hepatic metastases *J Vis Exp* 51677.

Tai H, Khairalseed M and Hoyt K 2019 Adaptive attenuation correction during H-scan ultrasound imaging using K-means clustering *Ultrasonics* 105987, in press https://doi.org/10.1016/j.ultras.2019.

Taylor K J, Riely C A, Hammers L, Flax S, Weltin G, Garcia-Tsao G, Conn H O, Kuc R and Barwick K W 1986 Quantitative US attenuation in normal liver and in patients with diffuse liver disease: importance of fat *Radiology* 160 65-71.

Waag R C 1984 A review of tissue characterization from ultrasonic scattering *IEEE Trans Biomed Eng* 31 884-93.

Waag R C, Lee P P K, Persson H W, Schenk E A and Gramiak R 1982 Frequency-dependent angle scattering of ultrasound by liver *J Acoust Soc Am* 72 343-52.

Wilson L S, Robinson D E and Doust B D 1984 Frequency domain processing for ultrasonic attenuation measurement in liver *Ultrason Imaging* 6 278-92.

Zagzebski J A, Lu Z F and Yao L X 1993 Quantitative ultrasound imaging: in vivo results in normal liver *Ultrason Imaging* 15 335-51.

SUMMARY

In one embodiment, a method of forming an image of a region of interest using a pulse-echo imaging device is described. The method includes the steps of generating a pulse using the pulse-echo imaging device; causing the pulse to be incident on the region of interest to generate a reflected echo; receiving the reflected echo in the pulse-echo imaging device; comparing a measure of frequency content of the reflected echo to the transmitted pulse and frequency shifted replicas of the transmitted pulse, wherein each is associated with a unique label; electing a label based on the comparison; and generating an image incorporating the selected label. In one embodiment, the measure of frequency content includes a measure of instantaneous frequency. In one embodiment, the measure of frequency content includes a measure of first moment of analytic spectrum. In one embodiment, the measure of frequency content includes a measure of variance of analytic spectrum. In one embodiment, the measure of frequency content includes a measure of higher order moments of the spectrum. In one embodiment, the measure of frequency includes a plurality of band pass filters. In one embodiment, the measure of frequency content is taken after correction for frequency dependent attenuation.

In one embodiment, a method of forming an image of a region of interest using a pulse-echo imaging device is described. The method includes the steps of generating a pulse using the pulse-echo imaging device; causing the pulse to be incident on the region of interest to generate a reflected echo; receiving the reflected echo in the pulse-echo imaging device; comparing a measure of frequency content of the reflected echo to the transmitted pulse and frequency shifted replicas of the transmitted pulse; selecting a label based on the comparison; and generating an image incorporating the selected label. In one embodiment, the step of comparing a measure of frequency comprises a comparison of the output of a plurality of band pass filters applied to the reflected echoes. In one embodiment, the step of selecting a color for display comprises a comparison of the output of a plurality of band pass filters. In one embodiment, the method includes the step of generating and reporting at least one statistic about the region of interest based on the comparison. In one embodiment, the at least one statistic is generated by calculating at least one of a mean and standard deviation of output channels, and measures of first and second order statistics.

In one embodiment, a method of forming an image of a region of interest using a pulse-echo imaging device is described. The method includes the steps of generating a pulse using the pulse-echo imaging device; causing the pulse to be incident on the region of interest to generate a reflected echo; receiving the reflected echo in the pulse-echo imaging device; comparing the reflected echo to the transmitted pulse, the time derivative of the pulse, and the second derivative of the pulse, wherein each is associated with a unique label; selecting a label based on the comparison; and generating an image incorporating the selected label.

In one embodiment, a method of forming an image of a region of interest using a pulse-echo imaging device is described. The method includes the steps of generating a pulse using the pulse-echo imaging device; causing the pulse to be incident on the region of interest to generate a reflected echo; receiving the reflected echo in the pulse-echo imaging device; comparing the reflected echo to the transmitted pulse, and power law shifted versions of the pulse, wherein each is associated with a unique label; selecting a label based on the comparison; and generating an image incorporating the selected label.

In one embodiment, a method of forming an image of a region of interest using a pulse-echo imaging device is described. The method includes the steps of generating a pulse using the pulse-echo imaging device; causing the pulse to be incident on the region of interest to generate a reflected echo; receiving the reflected echo in the pulse-echo imaging device; comparing the reflected echo to at least one frequency shifted replica of the transmitted pulse, wherein each frequency shifted replica is associated with a color; selecting a color for display based on the comparison; and generating an image incorporating the selected color.

In one embodiment, a method of forming an image of a region of interest using a pulse-echo imaging device is described. The method includes the steps of generating a pulse using the pulse-echo imaging device; causing the pulse to be incident on the region of interest to generate a reflected echo; receiving the reflected echo in the pulse-echo imaging device; convolving the reflected echo to at least one matched filter, wherein each matched filter is associated with a color; selecting a color for display based on the comparison; and generating an image incorporating the selected color.

In one embodiment, a method of forming an image of a region of interest using a pulse-echo imaging device includes the steps of generating a pulse using the pulse-echo imaging device, causing the pulse to be incident on the region of interest to generate a reflected echo, receiving the reflected echo in the pulse-echo imaging device, comparing the reflected echo to at least one Hermite polynomial, wherein each Hermite polynomial is associated with a color, selecting a color for display based on the comparison, and generating an image incorporating the selected color. In one embodiment, a plurality of the Hermite polynomials are defined by the formula $$H_n(t) = (-1)^n e^{t^2} \frac{d^n}{dt^n} e^{-t^2}$$

$$n = 0, 1, 2 \ldots \; ; t \in \pm\infty.$$

In one embodiment, weighted Hermite polynomials are represented by

| Hermite polynomial | | Energy |
|---|---|---|
| n | $H_nG$ | Energy |
| 0 | $(1)G$ | $\sqrt{\pi/2}$ |
| 1 | $(2t)G$ | $\sqrt{\pi/2}$ |
| 2 | $(4t^2 - 2)G$ | $3\sqrt{\pi/2}$ |
| 3 | $(8t^3 - 12t)G$ | $15\sqrt{\pi/2}$ |
| 4 | $(16t^4 - 48t^2 + 12)G$ | $105\sqrt{\pi/2}$ |
| 5 | $(32t^5 - 160t^3 + 120t)G$ | $945\sqrt{\pi/2}$ |
| n | $H_nG = (-1)^n [2tH_{n-1}(t) - 2(n-1)H_{n-2}(t)]$ | |

Notation: $G = \exp(-t^2)$.
Energy $= \int_{-\infty}^{\infty} G^2 H_n^2 dt = 1 \times 3 \times 5 \times \ldots \times |2n-1| \times \sqrt{\pi/2}$.

In one embodiment, the step of selecting a color for display includes a comparison to a plurality of values based on convolution of the received echoes with $GH_4(t)$, $GH_5(t)$ and $GH_6(t)$. In one embodiment, the step of selecting a color for display further includes determining a red (R), green (G) and blue (B) value for generating an RGB color. In one embodiment, an envelope is applied to the received echo to determine a value for G, a convolution with $GH_4(t)$ is applied to determine a value for R, and a convolution with $GH_6(t)$ is applied to determine a value for B. In one embodiment, a convolution with $GH_2(t)$ is applied to determine a value for R, an envelope is applied is applied to determine a value for G, and a convolution with $GH_8(t)$ and an envelope are applied to determine a value for B. In one embodiment, $GH_2(t)$ and $GH_8(t)$ are each normalized by $\sqrt{E_n}$. In one embodiment, ratios of $H_2/H_8$ convolution outputs are used for weights in determining R and B values. In one embodiment, the Hermite polynomial is approximated by the pulse-echo such that its normalized cross-correlation in the time domain or spectral magnitudes exceeds approximately 0.85.

In one embodiment, a system for forming an image of a region of interest includes a pulse-echo imaging device configured to generate a pulse and received a reflected echo of the pulse, and a control unit in communication with the pulse-echo imaging device, where the control unit is configured to compare the reflected echo to at least one Hermite polynomial associated with a color, select a color for display based on the comparison, and generate an image incorporating the selected color. In one embodiment, a display unit is connected to the control unit. In one embodiment, a plurality of the Hermite polynomials are defined by the formula $$H_n(t) = (-1)^n e^{t^2} \frac{d^n}{dt^n} e^{-t^2}$$

$$n = 0, 1, 2\ldots; t \in \pm\infty.$$

In one embodiment, the control unit is configured to select a color for display by mapping the received echoes to a plurality of values based on comparison of the echoes with $GH_4(t)$, $GH_5(t)$ and $GH_6(t)$. In one embodiment, the control unit is configured to select a color for display by determining a red (R), green (G) and blue (B) value for generating an RGB color. In one embodiment, the control unit is configured to apply an envelope to determine a value for G, $GH_4(t)$ to determine a value for R, and $GH_6(t)$ to determine a value for B. In one embodiment, the control unit is configured to apply $GH_2(t)$ and an envelope to determine a value for R, an envelope to determine a value for G, and $GH_8(t)$ and an envelope to determine a value for B. In one embodiment, $GH_2(t)$ and $GH_8(t)$ are each normalized by $\sqrt{E_n}$. In one embodiment, the control unit is configured to use ratios of $H_2/H_8$ convolution outputs as weights in determining R and B values. In one embodiment, the Hermite polynomial is approximated by the pulse-echo such that its normalized cross-correlation in the time domain or spectral magnitudes exceeds approximately 0.85. In one embodiment, the method includes the step of generating and reporting at least one statistic about the region of interest based on the comparison. In one embodiment, the at least one statistic is generated by calculating at least one of a mean and standard deviation of output channels, and measures of first and second order statistics.

In one embodiment, a method of forming an image of a region of interest using a pulse-echo imaging device includes the steps of generating a pulse using the pulse-echo imaging device, causing the pulse to be incident on the region of interest to generate a reflected echo, receiving the reflected echo in the pulse-echo imaging device, comparing the reflected echo to the transmitted pulse, the time derivative of the pulse, and the second derivative of the pulse, where each is associated with a unique label, selecting a label based on the comparison, and generating an image incorporating the selected label. A number of digital filters and wavelets are known by those of ordinary skill in the arts to have approximate first derivative and second derivative behaviors and can be employed for this purpose.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing purposes and features, as well as other purposes and features, will become apparent with reference to the description and accompanying figures below, which are included to provide an understanding of embodiments and constitute a part of the specification, in which like numerals represent like elements, and in which:

FIG. 5A shows a conventional B-scan image using standard 50 dB dynamic range on the echo envelope. FIGS. 5B-5D show different weights applied to the $H_2$ and H8 outputs, assigned to red and blue channels respectively.

FIG. 7 is a schematic of shapes of inhomogeneities that cause reflections, with specific transfer functions in the frequency domain, creating specific orders of Gaussian weighted Hermite functions as echoes according to one embodiment. Right to left is ordered in increasing power of the frequency domain reflection function. Top row: Acoustic impedance Z(x) shows a ramp function, a step function, a thin wall, Rayleigh scatterers, and Hermite scatterers. Second row: the corresponding reflections under the convolution model, obtained by spatial derivative of the impedance function; a step (corresponding to an integration function), an impulse, a doublet (corresponding to a first derivative), a second derivative, and higher order derivatives. Note the addition of a random fractal ensemble of cylindrical vessels that may characterize tissue scattering sites. These have been found to correspond to fractional orders above or below unity. Third row: frequency domain transfer function corresponding to integration $f^{-1}$ all pass $f^0$, derivative $f^1$, second derivative $f^2$, and higher order derivatives $f^{2N}$. Bottom row: Matched filter order from the Gaussian weighted Hermite family corresponding to each corresponding structure, assuming a round trip impulse response of the transmitted pulse as a $GH_n(t)$ function. Most natural structures within tissues are thought to be within the $f^0$ to $f^2$ range, thus this range represents the core region for fine tuning of the H-scan analysis.

FIGS. 17A, B and C show three pixels in a B-mode image according to one embodiment. For each pixel in B-mode image, there are 256 matched filter convolution values. By selecting the maximum value, a color map. The x-axis represents indices among 256 Gaussian, and the y-axis represents relative amplitude of each convolution value. According to maximum amplitudes, A, B and C pixels are assigned as red, black, and blue in the RGB color map, respectively.

FIGS. 21A and 21D show H-scan images with H-scan box, and FIGS. 21B and 21E show H-scan color map data. FIGS. 21C and 21F show a half violin and half box plot.

DETAILED DESCRIPTION

Figure 1:
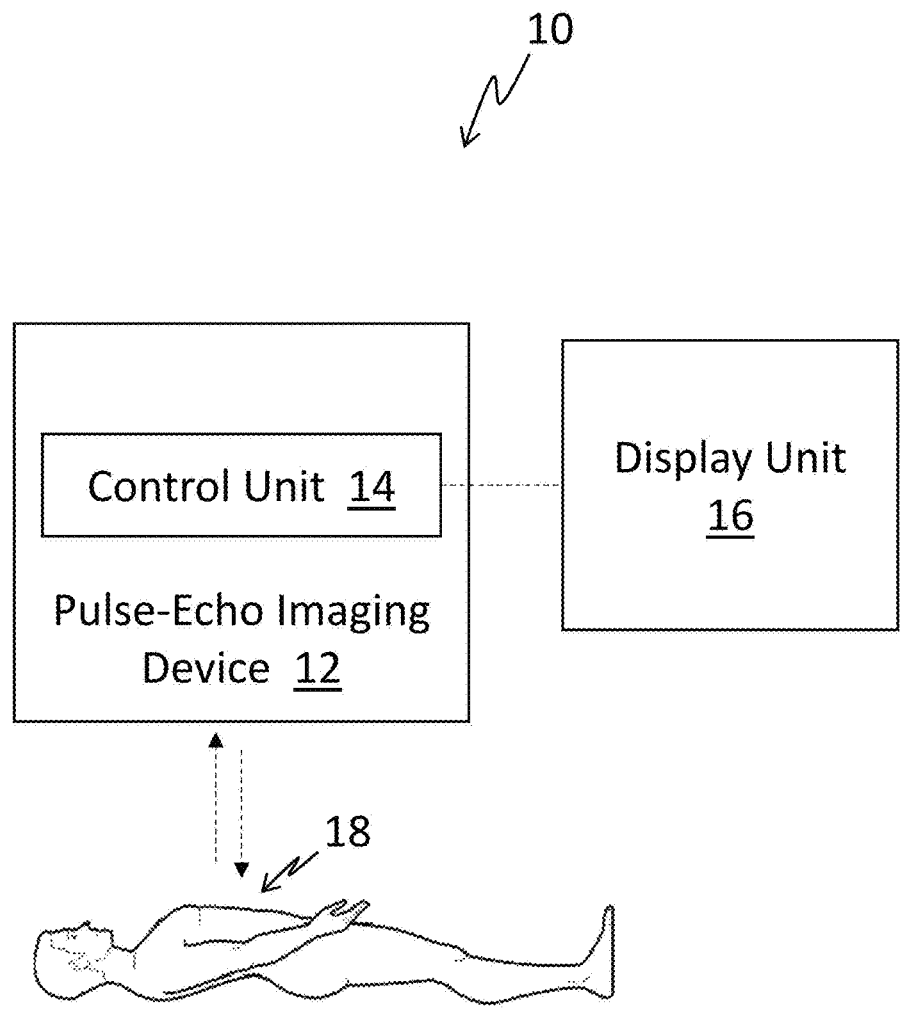
FIG. 1 is a system diagram of a scattering and reflection identification system according to one embodiment.

It is to be understood that the figures and descriptions have been simplified to illustrate elements that are relevant for a more clear comprehension, while eliminating, for the purpose of clarity, many other elements found in systems and methods of scattering and reflection identification. Those of ordinary skill in the art may recognize that other elements and/or steps are desirable and/or required in implementing the systems and methods described herein. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which embodiments belongs. Although any methods and materials similar or equivalent to those described herein can be used in the practice or testing of the embodiments, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects can be presented in a range format. It should be understood that the description in range format is merely for convenience and brevity and should not be construed as an inflexible limitation on the scope. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a scattering and reflection identification system and method.

Under a number of reasonable assumptions, it is possible to model the pulse-echo A-line formation as a convolution of an incident pulse with a sequence of reflections (Cobbold, 2007; Macovski, 1983). The integration can be reduced to a convolution model (Macovski, 1983) such that the received echo e(t) is approximated by $$e(t) = A\left\{p(t)s(x, y) *** R\left(x, y, \frac{ct}{2}\right)\right\} \qquad (1)$$

where A is an amplitude constant, p(t) is the propagating pulse in the axial direction, s(x,y) is the beam width in the transverse and elevational axes (and thus the beam pattern is assumed to be a separable function, and R(x,y,z) is the 3D pattern of reflectors or scatterers. The speed of the sound is c, and with a round trip for the echo the axial distance Z is replaced by ct/2 in the 3D convolution represented by the symbol***.

In one dimensional derivations with an assumption of small spatial variations in the acoustic impedance Z=ρ/c, the function R can be shown to be related to the spatial derivative of Z in the direction Z of propagation of the imaging pulse:

$$R(z) \approx \left(\frac{1}{2}Z_0\right)\frac{\partial Z(z)}{\partial z} \qquad (2)$$

This relationship implies that specific structures yield characteristic reflections. A small incremental step function in acoustic impedance, along the direction of the propagating pulse, yields an impulse function for R. The returning echo is then simply a low amplitude replica of p(t,z). However, a thin layer of material with increased impedance yields a positive impulse at the front surface and a negative impulse at the back surface. In the limit this approaches the doublet function, which is the approximation of a derivative. In this case, the echo is a low amplitude approximation to the derivative of p(t,z) with respect to time. This implies a frequency content weighted by ω since a property of Fourier Transforms is (Bracewell, 1986)

$$\mathcal{F}\left\{\frac{\partial p}{\partial t}\right\} \rightarrow j\omega P(\omega) \qquad (3)$$

where $\mathcal{F}\{\ \}$ is the Fourier transform and P(ω) is the is the Fourier transform of p(t).

Finally, in more general scattering theory, the Born approximation for a small (subwavelength) spherical scatterer has a leading term for scattered pressure that is proportional to $\omega^2$ (Morse and Ingard, 1987). Furthermore, a cloud of small, weak scatterers, incoherently spaced, similarly has a scattered pressure dependence with a leading term proportional to $\omega^2$ (Morse and Ingard, 1987). Larger scatterers and random collections of scatterers with longer autocorrelation functions will have more complicated scattering vs. frequency formulas (Lerner and Waag, 1988; Waag et al., 1982; Campbell and Waag, 1983; Waag, 1984).

However, the $\omega^2$ frequency weighting is an important analytical endpoint because by Fourier Transform theorems, an $\omega^2$ weighting corresponds to the second derivative of a function:

$$\mathcal{F}\left\{\frac{\partial^2 p}{\partial t^2}\right\} \rightarrow \omega^2 P(\omega) \qquad (4)$$

To summarize, within some degree of approximation, the echo or reflection from an incremental step function of impedance produces an echo proportional to p(t). A thin layer of incrementally higher impedance produces an echo proportional to ∂p/∂t. A cloud of small weak scatterers produces an echo proportional to $\partial^2 p/\partial t^2$. Methods and systems for identifying echoes by their relationship to the transmitted pulse and its derivatives are described below.

A system 10 for scattering and reflection identification is shown in FIG. 1 according to one embodiment. The pulse-echo imaging device 12 is controlled by a control unit 14 that includes one or more memory and processor units. The pulse-echo imaging device 12 is configured to transmit a pulse and receive an echo that is reflected off of a region of interest 18, such as an organ within a human or animal body. The control unit 14 processes the received echo and sends an output to the display unit 16 for displaying an image.

To identify echoes by their relationship to the transmitted pulse and its derivatives, a family of functions related to the Hermite polynomials is utilized.

The successive differentiation of the Gaussian pulse exp$(-t^2)$ generates the nth order Hermite polynomial (see Table 1) (Poularikas, 2010). The Hermite polynomials are defined by the formula $$H_n(t) = (-1)^n e^{t^2} \frac{d^n}{dt^n} e^{-t^2} \qquad (5)$$

$$n = 0, 1, 2...; t \in \pm\infty$$

TABLE 1

Weighted Hermite polynomials

| n | Hermite polynomial | Energy |
|---|---|---|
| n | $H_nG$ | Energy |
| 0 | (1)G | $\sqrt{\pi/2}$ |
| 1 | (2t)G | $\sqrt{\pi/2}$ |
| 2 | $(4t^2 - 2)$G | $3\sqrt{\pi/2}$ |
| 3 | $(8t^3 - 12t)$G | $15\sqrt{\pi/2}$ |
| 4 | $(16t^4 - 48t^2 + 12)$G | $105\sqrt{\pi/2}$ |
| 5 | $(32t^5 - 160t^3 + 120t)$G | $945\sqrt{\pi/2}$ |
| n | $H_nG = (-1)^n [2tH_{n-1}(t) - 2(n-1)H_{n-2}(t)]$ | |

Notation: G = exp($-t^2$).
Energy = $\int_{-\infty}^{\infty} G^2 H_n^2 dt = 1 \times 3 \times 5 \times \ldots \times |2n-1| \times \sqrt{\pi/2}$.

The peak amplitude of the $H_nG$ functions increase with n. So does the Energy, related to the square of the signal integrated over time. In order to make a fair comparison between $H_nG$ functions, they are normalize them to constant energy. Note that these Hermite polynomials do no possess orthogonality properties unlike the longer duration Hermite functions (Poularikas, 2010; Abramowitz and Stegun, 1964).

Nonetheless, the $H_4(t)$ function resembles a typical broadband pulse. If a transducer element has a one-way transfer function of $$h(t) = e^{-t^2/(1/2)}[1 + H_2(t)] = e^{-t^2/(1/2)}[4t^2 - 1], \qquad (6)$$

then it can be easily shown that the two-way (transmit-receive) impulse response is:

$$h(t) \otimes h(t) = \left(\frac{\sqrt{2}}{64}\right) e^{-t^2/1} H_4(t) \qquad (7)$$

Assuming a pulse-echo system has a round trip impulse response of approximately $A_0H_4(t)G$, then from the logic of eqn (2)-(4) a reflection from a step function of acoustic impedance will be produced by a delta function $R(z)$ and a corresponding received echo proportional to $GH_4(t)$. However, a thin layer of higher impedance would have a discrete doublet (derivative) in impedance and an echo proportional to $GH_5(t)$ by the derivative nature of the Hermite polynomials. Finally, a small scatterer or incoherent cloud of small scatterers would exhibit a second derivative behavior and return an echo proportional to $GH_6(t)$.

In this framework, the identification task is simply to classify echoes by similarity to either $GH_4(t)$, or $GH_5(t)$, or $GH_6(t)$. A natural classification test employing the concept of matched filters (Lathi, 1983) in parallel would suggest a convolution of the received signal with scaled versions of $GH_4(t)$, or $GH_5(t)$, $GH_6(t)$ to form three post-processed signals. In one embodiment, the convolution of the received signal is used to compare the received signal to G (green). One could simply select the maximum value at each point in time or display the relative strength as colors.

Figure 2:
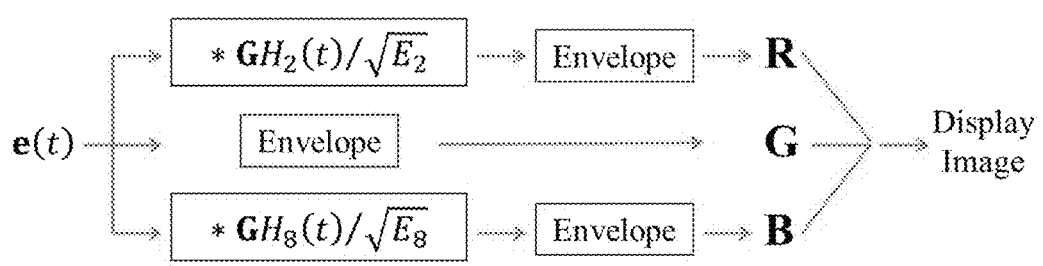
FIG. 2 is a flow chart of a method for determining RGB values according to one embodiment, where the * represents convolution.

The disadvantages of this are twofold. First, each convolution results in some loss of resolution, and secondly, the cross-correlation terms between $GH_4(t)$ and $GH_5(t)$, and similarly for $GH_6(t)$ and $GH_5(t)$ are substantial due to the large overlap of spectra. Other optimal receivers are outlined in Proakis (2001). However, a simpler approach uses the classic envelope as intensity (or "G" in RGB) with some filters applied to gage the relative strength of the echoes with respect to $GH_4(t)$ and $GH_6(t)$. In fact, discrimination can be improved by using more emphasis on the extremes of the spectra for example $GH_2(t)$ and $GH_8(t)$, each normalized by $\sqrt{E_n}$. A simplified flow chart is shown in FIG. 2.

Alternatively, in certain embodiments, the ratios of the $H_2/H_8$ convolution, and $H_8/H_2$ outputs can be taken and used as weights for the "R" and "B" channels, respectively. The lower frequency ($H_2$) was chosen for R and the higher frequency ($H_8$) for B in accordance with the conventions of optical scattering.

Figure 3:
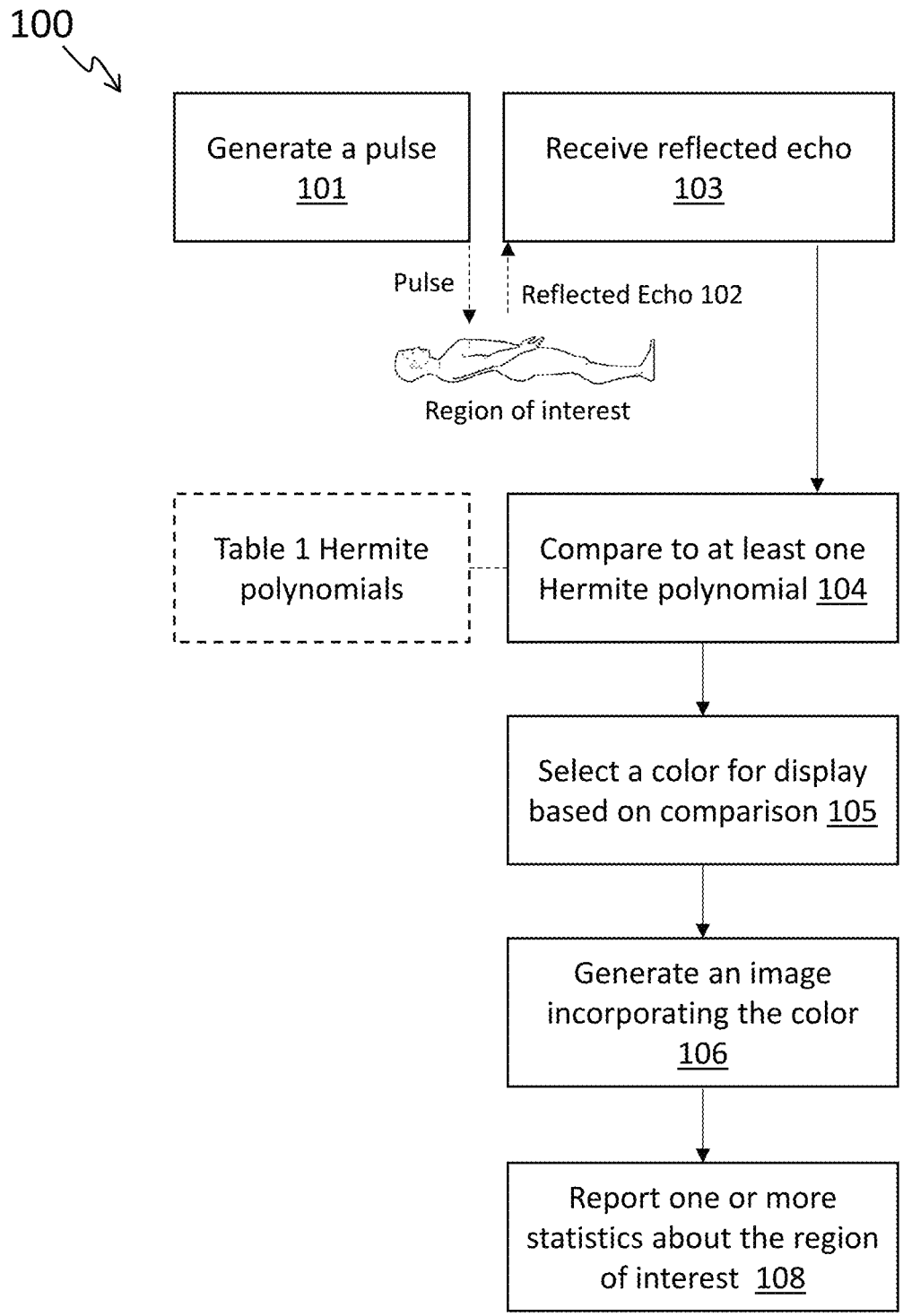
FIG. 3 is a flow chart of a method for forming an image of a region of interest using a pulse-echo imaging device according to one embodiment.

A method 100 of forming an image of a region of interest using a pulse-echo imaging device is described in FIG. 3, according to one embodiment. A pulse is generated using the pulse-echo imaging device 101. The pulse is incident on the region of interest, and it generate a reflected echo off of the region of interest 102. The reflected echo is received in the pulse-echo imaging device 103, and the reflected echo is compared to at least one Hermite polynomial 104. In one embodiment, the Hermite polynomials are represented by the Hermite polynomials in Table 1 above. Each Hermite polynomial is associated with a color. A color for display is selected based on the comparison 105, and an image is generated incorporating the selected color 106. In one embodiment, a comparison to a plurality of values based on $GH_4(t)$, $GH_5(t)$ and $GH_6(t)$ during the step of selecting a color for display. In one embodiment, a red (R), green (G) and blue (B) value for generating an RGB color is determined during the step of selecting a color for display. In one embodiment, an envelope is applied to determine a value for G, $GH_4(t)$ is applied to determine a value for R, and $GH_6(t)$ is applied to determine a value for B. In one embodiment, $GH_2(t)$ and an envelope are applied to determine a value for R, an envelope is applied to determine a value for G, and $GH_8(t)$ and an envelope are applied to determine a value for B. In one embodiment, $GH_2(t)$ and $GH_8(t)$ are each normalized by $\sqrt{E_n}$. In one embodiment, ratios of $H_2/H_8$, and $H_8/H_2$ convolution outputs are used for weights in determining R and B values, respectively. In one embodiment, the statistics of the analysis are reported for a given region of interest within the body 108. For example, in one embodiment, the mean and standard deviation of the output of the three channels shown in FIG. 2, the measures of the first and second order statistics, and their corresponding ratios are reported in addition to the output image. Advantageously, this provides a quantitative summary of the findings in addition to the image.

In one embodiment, a method of forming an image of a region of interest using a pulse-echo imaging device, a pulse is generated using the pulse-echo imaging device. The pulse is generated such that the pulse is incident on the region of interest to generate a reflected echo. A reflected echo is received in the pulse-echo imaging device. The reflected echo is compared to the transmitted pulse, the time derivative of the pulse, and the second derivative of the pulse, and each is associated with a unique label. A label is selected based on the comparison, and an image is generated incorporating the selected label.

In addition to the embodiment described herein, there are optical systems that provide high spatial resolution images, for example Optical Coherence Tomography (OCT), with range dependent signals dependent on optical backscatter and reflections comporable to pulse-echo imaging signals, and where the signals can be analyzed by the methods described herein.

EXPERIMENTAL EXAMPLES

Figure 4A:
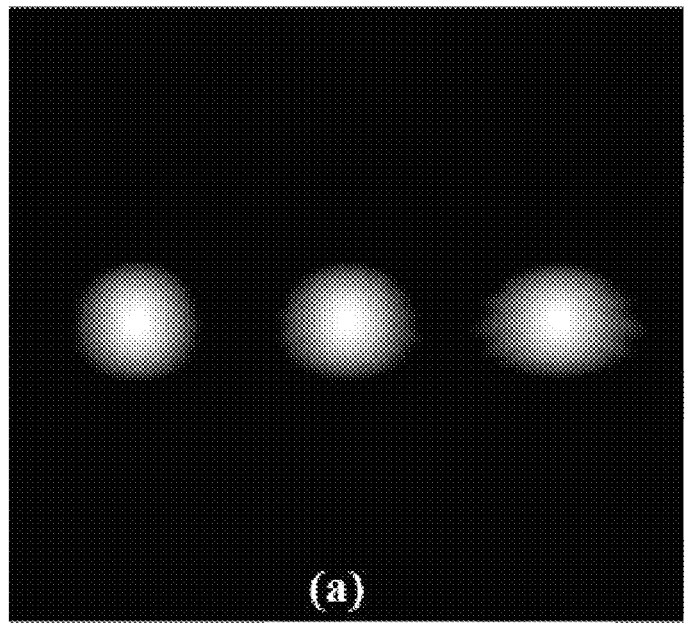
FIGS. 4A and 4B are experimental images of a FIELD II simulation of three scatterers according to one embodiment. A B-scan image with gray scale 50 dB envelope detection is shown in FIG. 4A, while FIG. 4B demonstrates the presence of blue and orange color dimensions.
Figure 4B:
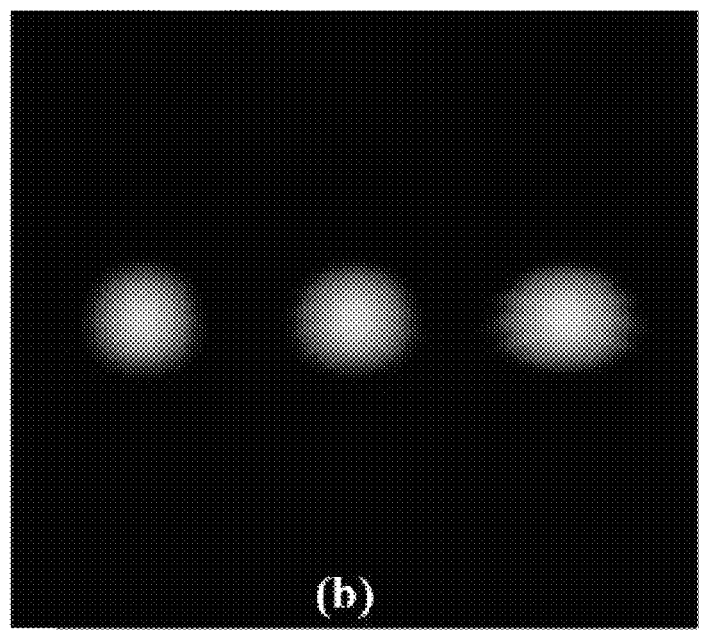
Figure 5A:
FIGS. 5A-5D are experimental B-scan images of a normal human liver at 5 MHz.
Figure 5B:
Figure 5C:
Figure 5D:

To demonstrate the potential of this approach to identify properties that are otherwise hidden in the conventional B-scan, a FIELD II simulation (Jensen, 1996) of three scatterers are shown in FIG. 4. Conventional imaging parameters are used including a 5 MHz center frequency linear array transducer with Gaussian apodization on transmit and receive and a 50 MHz sampling rate. However, a $GH_4(t)$ round trip impulse response was implemented, scaled to a peak frequency of 5 MHz. The three scatterers were located at the transmit focus depth of 65 mm with a 7 mm lateral spacing. Importantly, the right scatterer is a conventional single impulse, the center scatterer a discrete doublet (axially) and the left scatterer a discrete triplet. Thus the scatterers approximately produce reflections that correspond to the pulse, the derivative of the pulse, and the second derivative of the pulse with respect to time. The resulting B-scan image with gray scale 50 db envelope detection is given in FIG. 4A and the three scatterers are similar with small variation in transverse width. In comparison, FIG. 4B (color) demonstrates the "blue" nature of the left scatterer and the "orange" nature of the right scatterer, consistent with their respective properties and frequency weighting according to the derivative operator and eqn (2)-(4). Significantly, the three scatterers are fundamentally different in their respective frequency response. This intrinsic difference cannot be seen on the conventional grey scale B-scan image, FIG. 4A, but the differences can be visualized using this invention as shown by the colors in FIG. 4B.

As a second example, shown in FIGS. 5A-5D, a B-scan of a normal human liver at 5 MHz is analyzed and imaged. Although conventional systems do not attempt to transmit a $H_4(t)$ function, the conventional transmitted pulse has some similarities. So an approximate analysis can be performed using the $H_2$ and $H_8$ correlation functions and then assignment of colors as described above. The first image (4A) shows the conventional appearance of the B-scan using standard 50 dB dynamic range on the echo envelope. The color images (5B-5D) demonstrate different weights applied to the $H_2$ and $H_8$ outputs, assigned to red and blue channels, respectively. These enable a recognition of an added dimension as each region of the echoes are characterized by their low (yellow), medium (white), or high (blue) frequency content as determined by the impedance function present in tissue along the direction of the propagating pulse. Thus, the fine-scale nature of the different reflectors is visualized using the color scheme. The smallest scatterers and ensembles of small scatterers are expected to produce the more blue colors, whereas the largest interfaces are expected to produce the more red/yellow colors, even if these cannot be discriminated within the conventional B-scan envelope image. Note that in this example, a conventional ultrasound scanner was used with a conventional broadband pulse that is approximated by a Hermite polynomial function. Thus, the invention can be implemented on systems that can approximate, but do not necessarily conform exactly to, Hermite polynomial functions. For example, in one embodiment, pulses are similar to Hermite polynomial functions when their normalized cross-correlations in the time domain or spectral magnitudes exceed approximately 0.85.

Fine-Tuning the H-Scan for Visualizing Types of Tissue Scatterers

While the matched filter approach shown in FIG. 2 is an efficient and effective means for identifying scattering types, other equivalent calculations are also possible within the framework of this analysis. One alternate embodiment can result from examining the frequency content of the returned signals. In the frequency domain, the effect of a first temporal derivative operation corresponds to an $\omega$ weighting as seen in equation 3. A second temporal derivative operation corresponds to $\omega$ squared weighting as shown in equation 4. These operations effectively multiply the spectrum of the pulse echo signal by a ramp or a parabola, respectively, thereby weighting the higher frequencies more strongly. This can also be understood from Table 1 where the higher order Gaussian Weighted Hermite functions are represented by higher order polynomials in t, corresponding to more rapid fluctuations of the signal. The more rapid fluctuations in the time domain correspond directly to higher frequency content in the frequency domain. Because of this direct correspondence, measures of frequency content can be applied in place of the direct matched filter approach of FIG. 2.

One such calculation is the Instantaneous Frequency calculation, based on the rate of change of the phase of the analytic signal. The calculation of Instantaneous Frequency will indicate lower values for echoes e(t) corresponding to GH2(t) functions in FIG. 2, and alternatively higher values for echoes corresponding to GH8(t) functions. Given that direct relation, the matched filters of FIG. 2 can be replaced by a calculation of Instantaneous Frequency of e(t), with the lower values mapped to the red channel of the display and higher values mapped to the blue channel of the display. The result will be a color images with the blue hue identifying small, Rayleigh type of scatterers as described above and in equation 4.

Other such measures include the moments and variance of the spectrum of the returned echoes from scatterers. These can be implemented in the time domain or the frequency domain following windowing operation, and higher frequency content can be mapped to the blue channel of the display, lower frequency content to the red channel, based on the properties of the spectra commensurate with equations 2-4 as well as the content of the Gaussian weighted Hermite functions of Table 1.

Embodiments of the system and method described herein determine the shift in center frequency, along with time frequency domain characteristics of echoes and provide for a general power law transfer function to capture the major characteristics of scattering types. With this general approach, the H-scan matched filters can be set to elicit more fine grain shifts in scattering types, commensurate with more subtle changes in tissue morphology. Compensation for frequency dependent attenuation is helpful for avoiding beam softening effects with increasing depths. Examples from phantoms and normal and pathological tissues are provided to demonstrate that the H-scan analysis and displays are sensitive to scatterer size and morphology, and can be adapted to conventional imaging systems.

A new hypothesis has been formulated that the cylindrical-shaped fluid vessels within tissue parenchyma are predominantly responsible for the echoes commonly captured by imaging systems (Parker et al., 2019; Parker, 2019b, a). Within this framework and within a more general framework encompassing different classical scattering models, the H-scan analysis can be helpful in discriminating between tissue types (Parker, 2016b, a; Khairalseed et al., 2017; Ge et al., 2018; Khairalseed et al., 2019a; 2019b). In essence, the H-scan seeks to make a matched filter for the case of a bandpass ultrasound pulse incident on a tissue scatterer or reflector, and producing an echo. The output of a set of matched filters covering the different types of expected scatterers, shown in FIG. 6, can be examined to determine a best fit to any particular echo or segment, and this additional information can be encoded as a color overlay or a quantitative map. In this way the H-scan analysis provides relatively high resolution and localized information about the nature of the underlying tissue.

Embodiments of systems and methods for fine-tuning of the H-scan analysis are disclosed for more sensitive discrimination of small changes in scatterers within different regions or over time in response to the progression of disease or the effects of therapy. First, under the hypothesis that the fluid-filled cylindrical vessels and channels form the dominant scattering sites, an examination of theory concludes that small shifts in the center frequency of a bandpass interrogating pulse are created from different sizes of scatterers. Secondly, these effects can be masked by strong frequency dependent attenuation. However, after careful compensation for attenuation, the H-scan bank of matched filters is capable of discriminating between the shifts in spectral characteristics.

Figure 6:
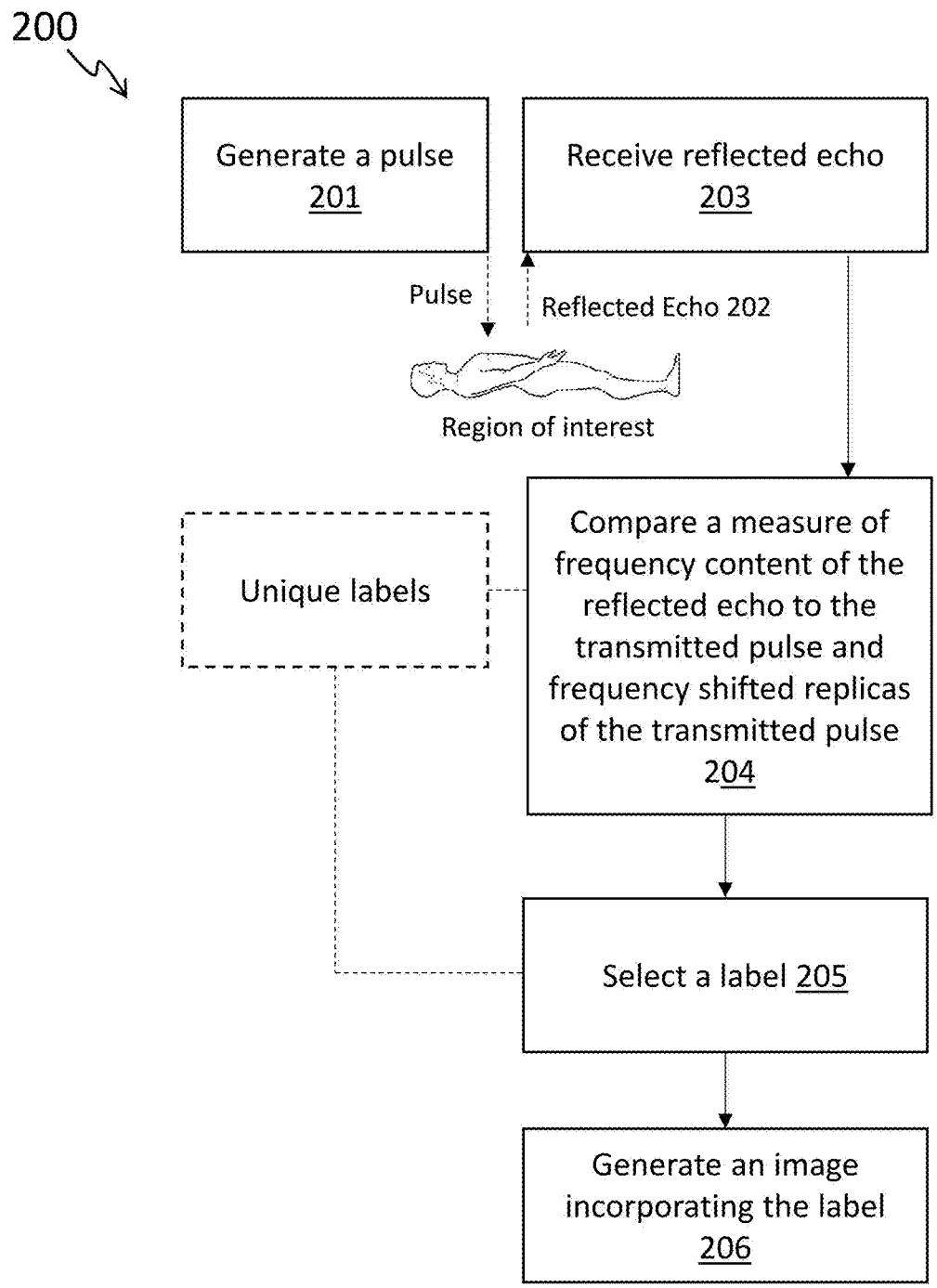
FIG. 6 is a flow chart of a method for forming an image of a region of interest using a pulse-echo imaging device according to one embodiment.

In one embodiment and with reference now to FIG. 6, a method 200 of forming an image of a region of interest using a pulse-echo imaging device is described according to one embodiment. The method includes the steps of generating a pulse using the pulse-echo imaging device 201, causing the pulse to be incident on the region of interest to generate a reflected echo 202, receiving the reflected echo in the pulse-echo imaging device 203, comparing a measure of frequency content of the reflected echo to the transmitted pulse and frequency shifted replicas of the transmitted pulse, wherein each is associated with a unique label 204, selecting a label based on the comparison 205, and generating an image incorporating the selected label 206. In one embodiment, the measure of frequency content includes a measure of instantaneous frequency. In one embodiment, the measure of frequency content includes a measure of first moment of analytic spectrum. In one embodiment, the measure of frequency content includes a measure of variance of analytic spectrum. In one embodiment, the measure of frequency content includes a measure of higher order moments of the spectrum. In one embodiment, the measure of frequency content includes the use of a bank of bandpass filters with different peak frequencies. In one embodiment, the measure of frequency content is applied following correction for the frequency dependent attenuation of the tissue. In one embodiment, the measure of frequency includes a plurality of band pass filters. In one embodiment, the measure of frequency content is taken after correction for frequency dependent attenuation.

In one embodiment, a method of forming an image of a region of interest using a pulse-echo imaging device is described. A pulse is generated using the pulse-echo imaging device, causing the pulse to be incident on the region of interest to generate a reflected echo. The reflected echo is received in the pulse-echo imaging device. A measure of frequency content of the reflected echo is compared to the transmitted pulse and frequency shifted replicas of the transmitted pulse. A label is selected based on the comparison. An image is generated incorporating the selected label. In one embodiment, the step of comparing a measure of frequency comprises a comparison of the output of a plurality of band pass filters applied to the reflected echoes. In one embodiment, the step of selecting a color for display comprises a comparison of the output of a plurality of band pass filters. In one embodiment, the method includes the step of generating and reporting at least one statistic about the region of interest based on the comparison. In one embodiment, the at least one statistic is generated by calculating at least one of a mean and standard deviation of output channels, and measures of first and second order statistics.

In one embodiment, a method of forming an image of a region of interest using a pulse-echo imaging device is described. A pulse is generated using the pulse-echo imaging device, causing the pulse to be incident on the region of interest to generate a reflected echo. The reflected echo is received in the pulse-echo imaging device, and compared to the transmitted pulse, the time derivative of the pulse, and the second derivative of the pulse, where each is associated with a unique label. A label based on the comparison is selected, an image incorporating the selected label is generated.

In one embodiment, a method of forming an image of a region of interest using a pulse-echo imaging device is described. A pulse is generated using the pulse-echo imaging device, causing the pulse to be incident on the region of interest to generate a reflected echo. The reflected echo is received in the pulse-echo imaging device, and the reflected echo is compared to the transmitted pulse, and power law shifted versions of the pulse, where each is associated with a unique label. A label is selected based on the comparison, and an image incorporating the selected label is generated.

In one embodiment, a method of forming an image of a region of interest using a pulse-echo imaging device is described. A pulse is generated using the pulse-echo imaging device, causing the pulse to be incident on the region of interest to generate a reflected echo. The reflected echo is received in the pulse-echo imaging device and the reflected echo is compared to at least one frequency shifted replica of the transmitted pulse, where each frequency shifted replica is associated with a color. a color for display is selected based on the comparison, and an image is generated incorporating the selected color.

In one embodiment, a method of forming an image of a region of interest using a pulse-echo imaging device is described. A pulse is generated using the pulse-echo imaging device, causing the pulse to be incident on the region of interest to generate a reflected echo. The reflected echo is received in the pulse-echo imaging device and the reflected echo is convolved to at least one matched filter, where each matched filter is associated with a color. A color for display is selected based on the comparison, and an image is generated incorporating the selected color.

Figure 7:
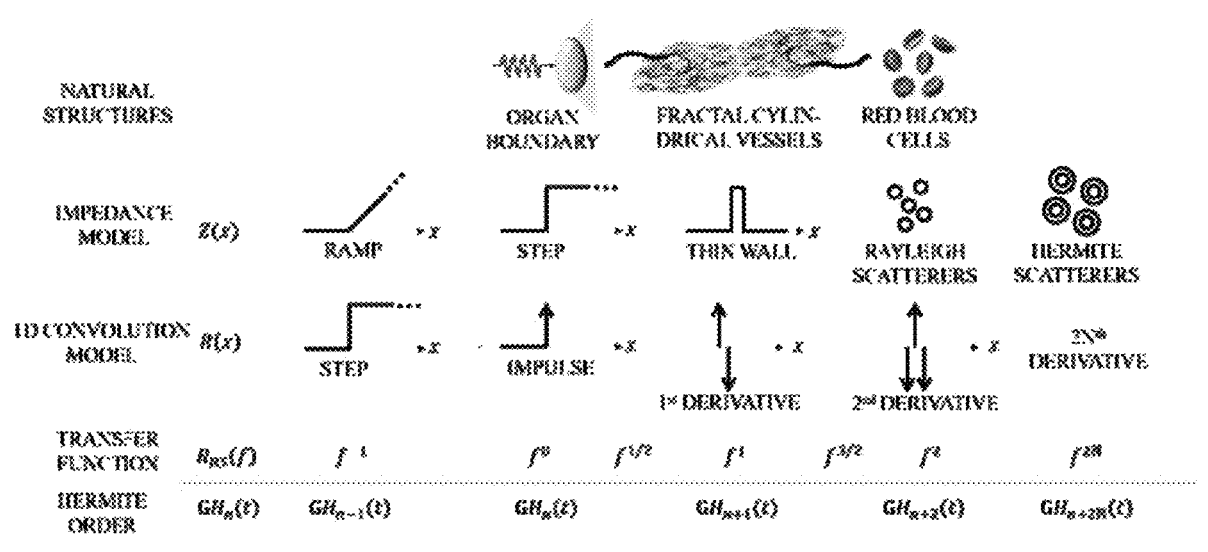

The theory underlying embodiments described herein for fine-tuning the h-scan for visualizing types of tissue scatterers will now be discussed in more detail. Considering the many different theories of scattering from inhomogeneities, and then all of the different types of scatterers and reflectors within tissues, a coherent framework for characterizing the nature of tissue scattering is provided in order to apply sensitive matched filters to distinguish between the classes. As an overview, it should be noted that the exact solutions for strong scatterers such as spheres and cylinders can be very complex, requiring infinite series of spherical or cylindrical Green's functions (Faran Jr., 1951; Born and Wolf, 1980). The situation becomes more tractable in the case of weak scattering using the Born approximation (Rayleigh, 1918; Morse and Ingard, 1987; Insana et al., 1990; Insana and Brown, 1993), where closed form solutions in terms for scattered waves can be formulated as a type of a spatial Fourier transform of the scatterer shape, or else in the case of random structures, as a transform of the correlation function (Debye and Bueche, 1949). Another useful simplified framework comes from viewing the pulse echo process as a convolution (Macovski, 1983). Within the convolution framework and assuming generic bandpass pulses, it can be shown that the transfer function of structures or scatterers can sometimes be viewed as simple frequency domain functions corresponding to a perfect plane reflector (all pass filter or transfer function of $f^0$), or a derivative ($f^1$), or in-between. For example, the ensemble average amplitude from the liver has been estimated as $f^{0.7}$ (Campbell and Waag, 1984; Parker et al., 2019; Parker, 2019b), consistent with the expected scattering from the fractal branching vasculature. Transfer functions can increase as $f^2$ for Rayleigh scatterers or even higher for Hermite scatterers (Parker, 2017; Astheimer and Parker, 2018). Schematically, this framework of scattering from tissue is depicted in FIG. 7 and some specific details will be explored below.

Assume a broadband pulse propagating in the x direction is given by separable functions:

$$P\left(y, z, t - \frac{x}{c}\right) = G_y(y, \sigma_y)G_z(z, \sigma_z)P_x\left(t - \frac{x}{c}\right), \quad (8)$$

where $G_y(y,\sigma_y)=\exp[-y^2/2\sigma_y^2]$, i.e., Gaussian in the y and similarly in the z directions, and where the pulse shape $P_x$ in the x direction is given by:

$$P_x(x) = GH_4\left(\frac{x}{\sigma_x}\right)\exp\left(-\frac{x}{\sigma_x}\right)^2 = 4e^{-x^2/\sigma_x^2}\left[3 - 12\left(\frac{x}{\sigma_x}\right)^2 + 4\left(\frac{x}{\sigma_x}\right)^4\right], \quad (9)$$

where $GH_4$ is a fourth-order Hermite polynomial for the pulse shape with a spatial scale factor of $\sigma_x$ (Parker, 2016a; Poularikas, 2010), representing a broadband pulse. Its spatial Fourier transform is then:

$$^{3D}\mathcal{F}\{P(x, y, z)\} = \quad (10)$$
$$\left(16e^{-k_x^2\pi^2\sigma_x^2}k_x^4\pi^{9/2}\sigma_x^5\right)\left(e^{-2k_y^2\pi^2\sigma_y^2}\sqrt{2\pi}\,\sigma_y\right)\left(e^{-2k_z^2\pi^2\sigma_z^2}\sqrt{2\pi}\,\sigma_z\right),$$

where Bracewell's convention (1965) is used for the form of the Fourier transform. Using a 3D convolution model (Macovski, 1983; Prince and Links, 2015; Bamber and Dickinson, 1980), dominant echoes are determined.

In the alignment where the pulse is propagating perpendicular to the long axis of a cylinder, the 3D convolution result is given by the product of the transforms:

$$^{3D}\mathcal{F}\{echo(x, y, z)\} = \mathcal{F}^{3D}\{p(x, y, z)\} \square (k_x)^2 \mathcal{F}^{3D}\{cylinder(x, y, z)\} = \quad (11)$$
$$\left(\left(16e^{-k_x^2\pi^2\sigma_x^2}k_x^4\pi^{9/2}\sigma_x^5\right)\left(e^{-2k_y^2\pi^2\sigma_y^2}\sqrt{2\pi}\,\sigma_y\right)\left(e^{-2k_z^2\pi^2\sigma_z^2}\sqrt{2\pi}\,\sigma_z\right)\right)$$
$$\square (k_x)^2 \,^{3D}\mathcal{F}\{cylinder(x, y, z)\},$$

where the $(k_x)^2$ term pre-multiplying the cylinder transform stems from the Laplacian spatial derivative in the Born scattering formulation (Rayleigh, 1918; Morse and Ingard, 1987) and in the 3D convolution model (Gore and Leeman, 1977; Bamber and Dickinson, 1980). One can consider the last two terms of eqn (11) as the frequency domain transfer function which can change the shape of the interrogating pulse. This is examined further in the next section.

Figure 8A:
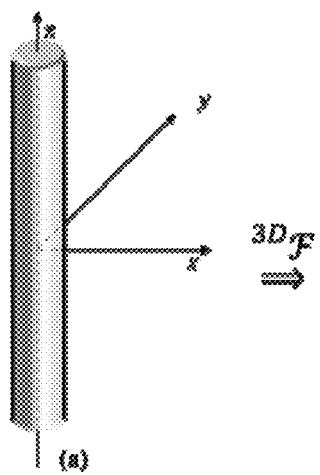
FIG. 8A represents a cylindrical weakly scattering element according to one embodiment. Its spatial Fourier transform is depicted in FIG. 8B according to one embodiment. The 3D spatial Fourier transform of a bandpass pulse incident normal to the cylinder is shown in FIG. 8C.
Figure 8B:
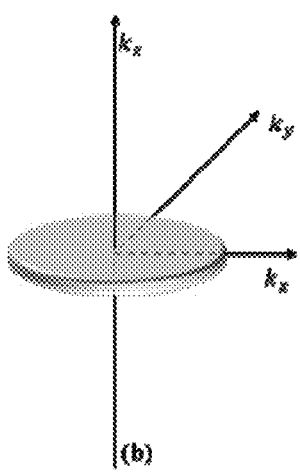
Figure 8C:
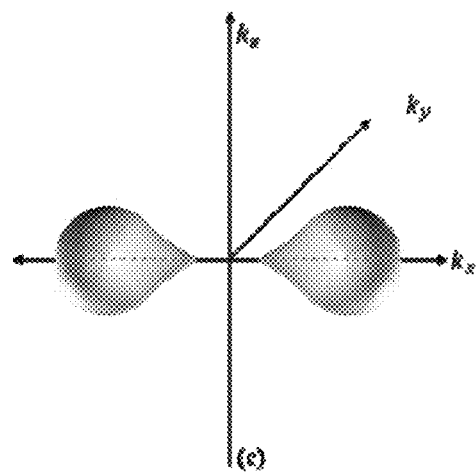

Consider an ideal cylindrical scatterer as a model of fluid-filled vessels, from very small microchannels of fluid to the largest arteries and veins that can exist within the organ. Specifically, a long fluid-filled cylinder of radius $\alpha$ is examined:

$$f(r) = \begin{cases} \kappa_0 & r \leq a \\ 0 & r > a \end{cases} \quad (12)$$
$$F(\rho) = \frac{\kappa_0 \cdot a \cdot J_1[2\pi a \cdot \rho]}{\rho},$$

where $\kappa_0$ is the fractional variation in compressibility, assumed to be $\square$ 1 consistent with the Born formulation, $F(\rho)$ represents the Hankel transform, which is the 2D Fourier transform of a radially symmetric function, $J_1[\cdot]$ is a Bessel function of order 1, and $\rho$ is the spatial frequency. The fractional variation in compressibility, $\kappa_0$, between blood vessels and liver parenchyma has been estimated to be approximately 0.03, or a 3% difference based on published data (Parker, 2019b). This cylinder is shown in FIG. 8(a), and the convolution transforms of eqn (4) are shown in FIG. 8(b) and FIG. 8(c) for the case of a pulse at normal incidence to the cylinder radius.

In addition, consider a "soft-walled" cylindrical vessel:

$$f(r) = \frac{\kappa_0 e^{-2\pi\sqrt{(\frac{r}{a})^2+1}}}{\sqrt{(\frac{r}{a})^2+1}} \text{ for } r > 0 \text{ and } a > 0. \quad (13)$$

Its Hankel transform is given by theorem 8.2.24 of Erdélyi and Bateman (1954):

$$f(\rho) = \frac{\kappa_0 a^2 e^{-2\pi\sqrt{(a\rho)^2+1}}}{2\pi\sqrt{(a\rho)^2+1}} \text{ for } \rho > 0 \text{ and } a > 0. \quad (14)$$

Figure 9A:
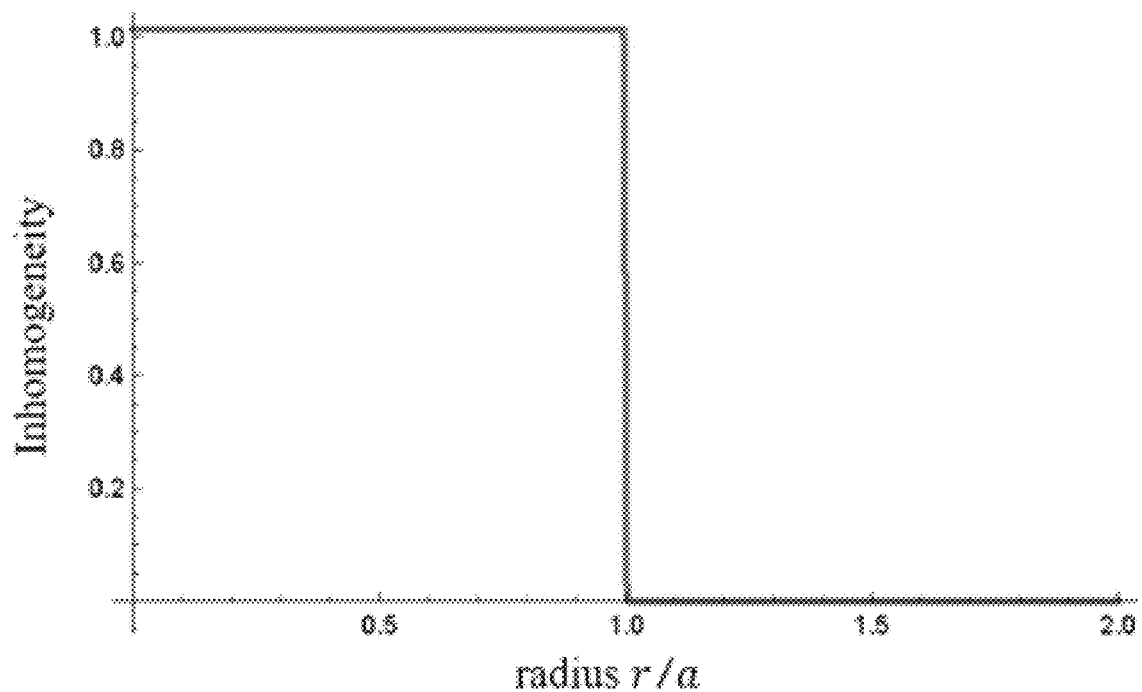
FIG. 9A represents an ideal cylindrical inhomogeneity function κ, and FIG. 9B its scattering transfer function in log-log scales according to one embodiment.
Figure 9B:
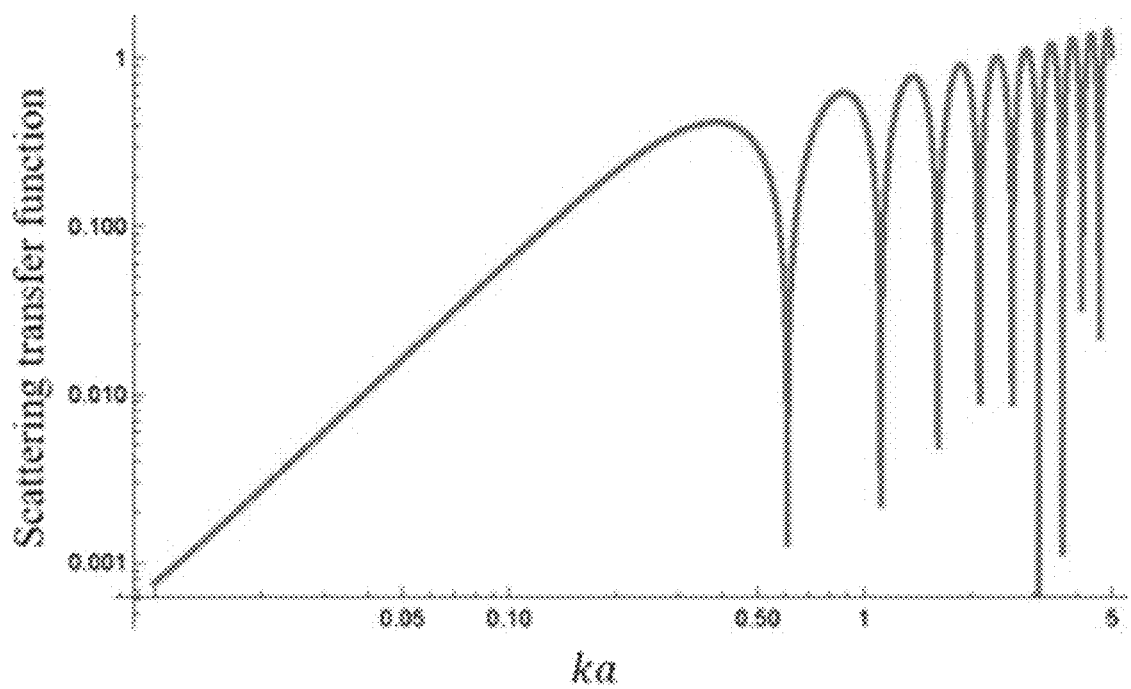
FIG. 9C represents a weak scattering inhomogeneity function κ as a function of cylindrical radius r for a "soft-walled" cylinder with unity radius. This "soft" shape avoids modeling perfect abrupt edges which may not be realized in all fluid vessels of soft tissues.
FIG. 9D represents a log-log plot of scattering transfer function vs. wavenumber×a for a "soft" cylindrical vessel at normal incidence to the propagating transmit pulse. For any narrowband pulse, the transfer function can be approximated as a power law (a slope on the log-log plot) which can vary as $f^2$ (low wavenumber, long wavelengths) to $f^0$ near kα=1, to negative power law values at larger wavenumbers. These correspond to the middle ranges of transfer functions indicated in FIG. 1.
Figure 9C:
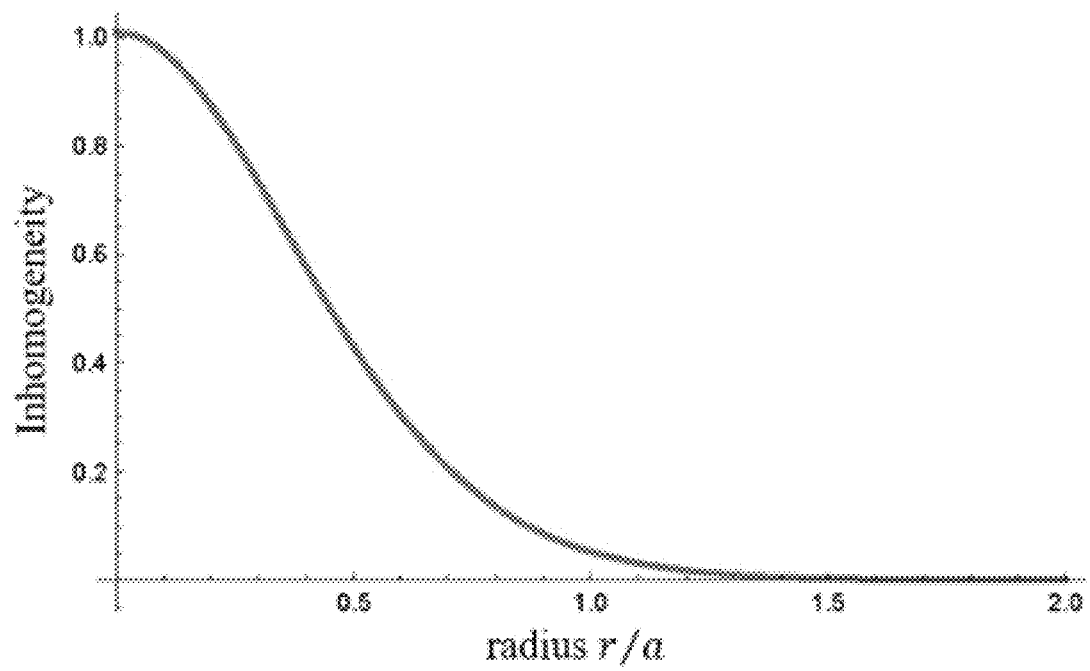
Figure 9D:
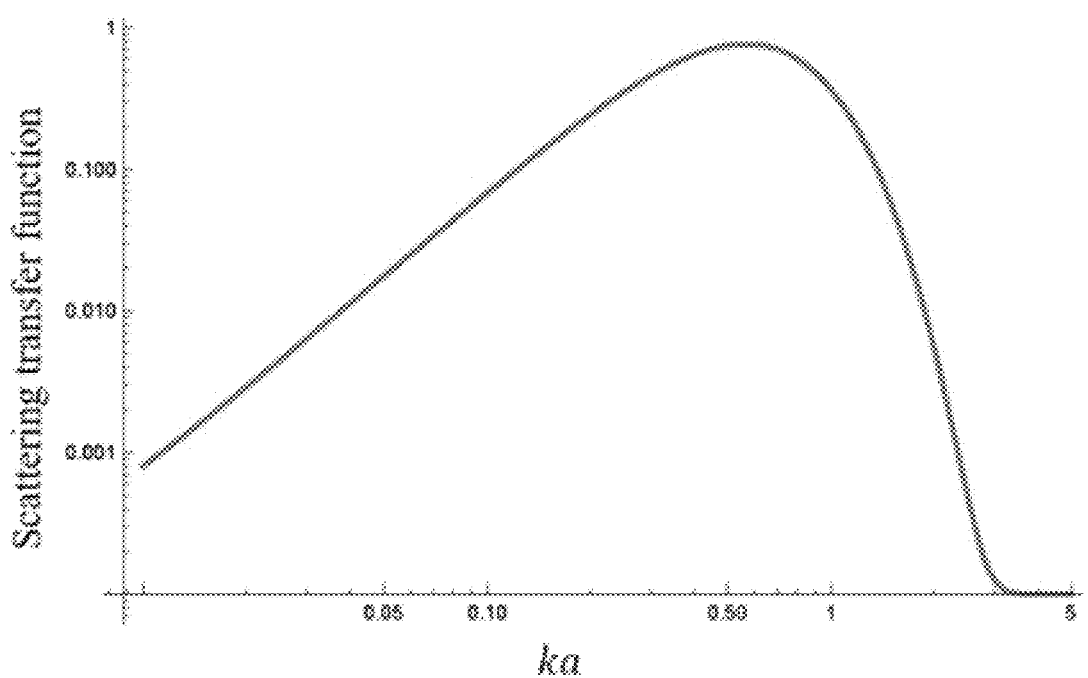

The cylindrical inhomogeneity functions of eqn (12) and eqn (13) are shown in FIGS. 9(a) and 9(b), respectively. When one takes $\rho = \sqrt{k_x^2+k_y^2}$ and evaluate $(k_x^2)(f(\rho))$ along the $k_x$ axis, as in in the convolution model, the result is shown in FIG. 9(b) and FIG. 9(d) for the two models. Any narrowband interrogating pulse will be affected by an approximate power law transfer function, from $f^2$ at low frequencies to $f^0$ near $k\alpha = 1$. For the ideal cylinder (FIGS. 9(a-b)), at higher $k\alpha$, the transfer function maxima increase $\square f^{1/2}$. However, for the soft-walled structure, the higher $k\alpha$ transfer function decreases as $f^{-1}$ or even more negative power laws.

It's assumed a broadband transducer is used to produce a pulse with a round-trip impulse response that is approximated by a Gaussian-weighted Hermite function, in this case of order 4, which is designated as $GH_4(t/\tau)$, where $\tau$ is a scale factor:

$$p(t) = 4e^{-\frac{t^2}{\tau^2}}\left(4\left(\frac{t}{\tau}\right)^4 - 12\left(\frac{t}{\tau}\right)^2 + 3\right), \quad (15)$$

and its Fourier transform is:

$$\mathfrak{I}\{p(t)\} = 4e^{-(f\pi\tau)^2}f^4\pi^{9/2}\tau^5. \quad (16)$$

Figure 10A:
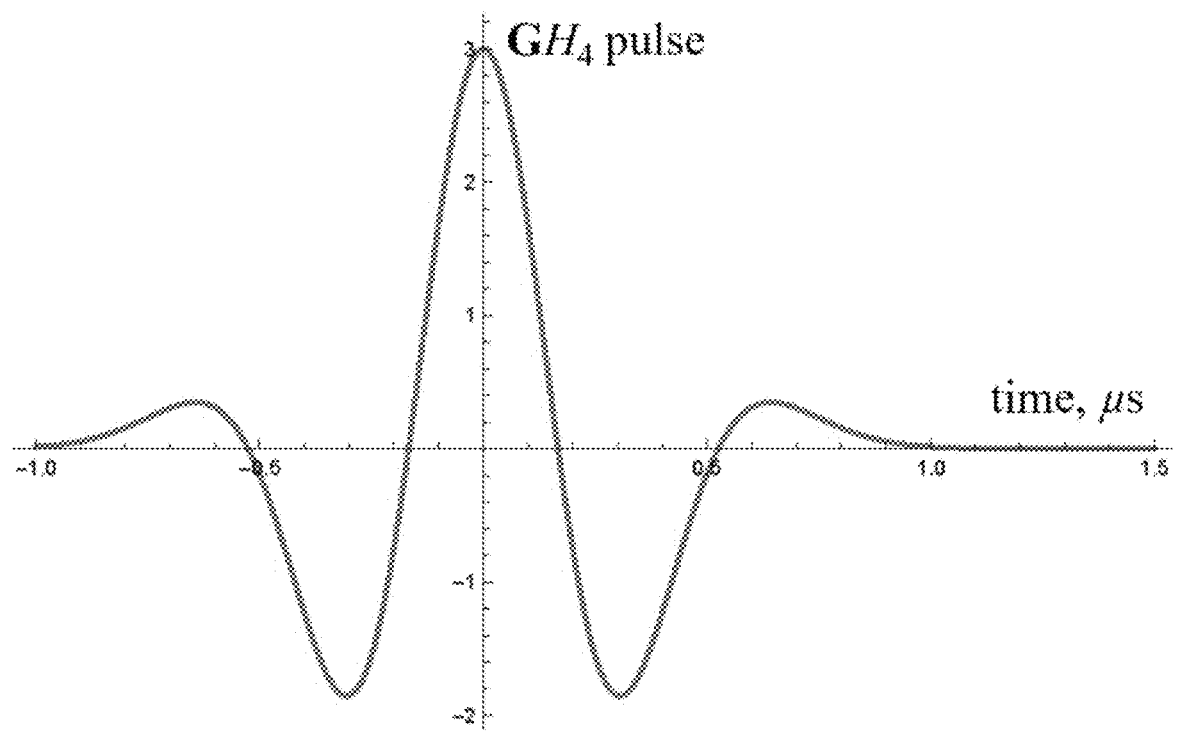
FIG. 10A represents a $GH_4(t/\tau)$ round-trip pulse shape where $\tau$ is $1/\pi$ μ s. Its Fourier transform is shown in FIG. 10B as a function of $f$ according to one embodiment. This time-frequency model is specific to the GH family, but is reasonable representative of a wider class of broadband ultrasound pulses.

The spectral peak occurs at $f_{max} = \sqrt{2}/\pi\tau$. The time and frequency domain representations of this function are shown in FIGS. 10(a) and (b), respectively.

Now it is assumed the convolution model with the transfer function from scatterers of $|f|^\gamma$, where for ensemble averages over liver, one expects $\gamma$ to be near 0.7 (Campbell and Waag, 1984). Note also that the choice of the transfer function as a real and even function of frequency implies that a real and even transmit pulse like the $GH_4$ will, upon convolution with the scatterer, return an echo that remains real and even in form. In the frequency domain, the transform of the echo is given by the product of the pulse and the transfer function, thus $$\mathfrak{I}\{p(t)\}\cdot|f|^\gamma = 4 f^{(4+\gamma)}e^{-(f\pi\tau)^2}\pi^{9/2}\tau^5 \text{ for } f > 0. \quad (17)$$

Figure 10B:
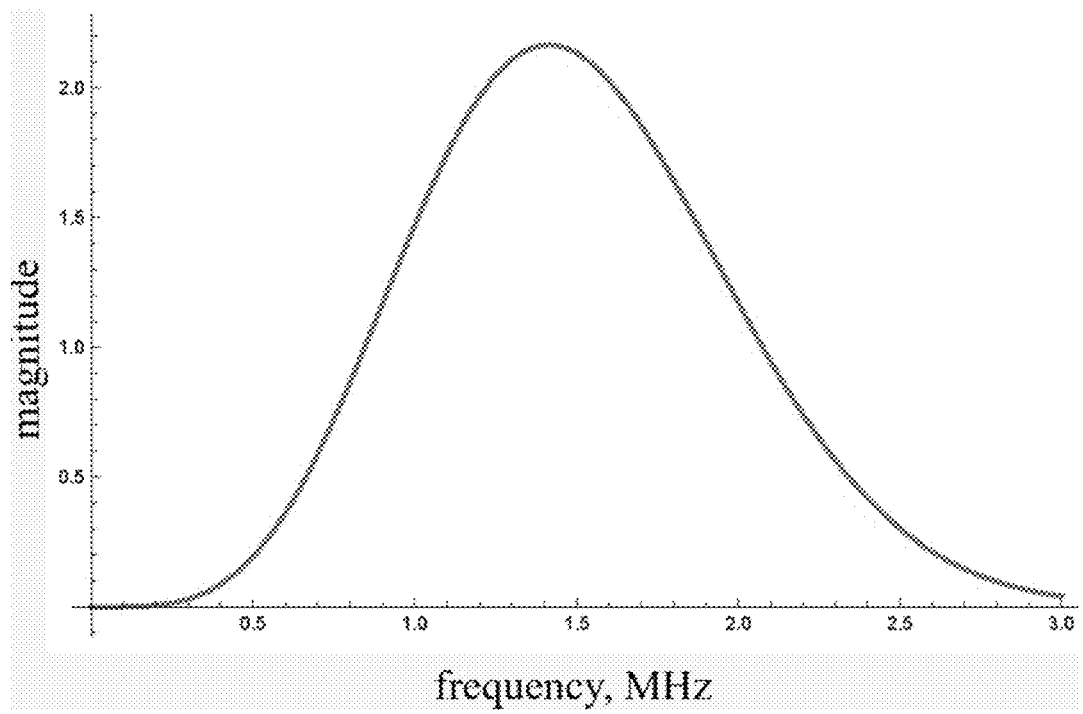

The inverse transform of this yields:

$$e(t) = \frac{4}{\pi^{(\gamma+1/2)}}\left(\frac{1}{\tau}\right)^\gamma \text{Gamma} \quad (18)$$
$$\left(\frac{5+\gamma}{2}\right) Hypergoemetric1F1\left(\frac{5+\gamma}{2}, \frac{1}{2}, -\frac{t^2}{\tau^2}\right),$$

where the hypergeometric function is defined in chapter 15 of Abramowitz and Stegun (1964). This function has the bandpass appearance similar to that shown in FIG. 10, but with an upshifted frequency content for positive $\gamma$.

It can be shown that for the echo spectrum of eqn (17), the peak frequency $f_{max}$ is given by:

$$f_{max} = \frac{\sqrt{(4+\gamma)}}{\sqrt{2}\,\pi\tau}. \quad (19)$$

This produces a relatively subtle shift in peak frequencies when tissue structures produce limited variations in around 0.7 because the square root of the $4+\gamma$ term in the numerator governs this effect, thus the fine tuning of the H-scan or matched filter operations requires examinations of these incremental shifts.

Note that similar effects are produced when alternative pulses are transmitted. Although the $GH_n$ pulses have general bandpass properties, some other specific models have been frequently used in simulations. For example, a sine-modulated Gaussian pulse is used, then:

$$p_g(t) = \exp\left(-\frac{t^2}{2\tau^2}\right)\sin(\omega_0 t), \qquad (20)$$

and $$P_g(f) = -i\tau\sqrt{\frac{\pi}{2}}\left[e^{-2(f-f_0)^2(\pi\tau)^2} - e^{-2(f+f_0)^2(\pi\tau)^2}\right]. \qquad (21)$$

After convolution with the scatterer transfer function of $|f|^\gamma$, the return echo can also be expressed in terms of hypergeometric functions. In the frequency domain, a shift caused by the power law can be calculated. For the Gaussian-shifted spectrum defined above, after multiplication by $|f|^\gamma$ the peak is:

$$f_{max} = \frac{1}{2}\left(f_0 + \sqrt{\frac{\gamma}{\pi^2\tau^2} + f_0^2}\right). \qquad (22)$$

In this case a matched filter can be approximated by shifted Gaussians, and the similarity to $GH_n$ functions can be quite close. However, the $GH_n$ family retains the advantage of possessing exact derivative relationships between integer orders (Poularikas, 2010).

For the functions $GH_n(t)$ derived from the $n^{th}$ derivative of a Gaussian (Poularikas, 2010; Parker, 2016c), the general frequency domain Fourier transform representation is $$\mathcal{F}\left\{GH_n\left(\frac{t}{\tau}\right)\right\} = \frac{f^n \tau^{n+1} e^{-(f\pi\tau)^2}}{\sqrt{2}} \qquad (23)$$

for integers $n>0$ and $f>0$.

The peak frequency $f_{max}$ is determined by taking the first derivative with respect to $f$ and finding its zero. The result is $f_{max}=\sqrt{n/2}/\pi\tau$ for the $GH_n(t/\tau)$ family. If one of this class of pulses is used in tissue backscatter imaging with a tissue comprised of scatterers with an ensemble average spectral magnitude of $|f^\gamma|$ and an attenuation of $e^{-\alpha \cdot f \cdot x}$, then the peak frequency will be influenced by their product. Again, using the first derivative to find the peak frequency of the altered spectrum results in:

$$f_{max}(\gamma, \alpha, x, \tau, n) = \frac{\sqrt{8(n+\gamma)\pi^2\tau^2 + \alpha^2 x^2} - \alpha x}{4\pi^2\tau^2} \qquad (24)$$

for $\{\gamma, \alpha, x, \tau, n\}>0$. As $\gamma\to 0$ and $\alpha x\to 0$, the result approaches the original spectral peak, $f_{max}=\sqrt{n/2}/\pi\tau$. As will be shown below, the strong cumulative effects of attenuation can mask any subtle change in scattering power law behaviors due to alterations of tissue structure.

Alternatively, if a conventional bandpass Gaussian pulse is utilized, a corresponding frequency can be calculated. For the expected spectral magnitude of $(A_0 e^{-(f-f_0)^2/2\sigma_f^2})|f^\gamma|(e^{-\alpha \cdot f \cdot x})$, where $f>0$, the peak frequency is given by $$f_{max}(f_0, \sigma_f, \gamma, \alpha, x) = 1/2(f_0 - \alpha\sigma_f^2 x + \sqrt{4\gamma\sigma_f^2 + (f_0 - \alpha\sigma_f^2 x)^2}). \qquad (25)$$

These functions display a nearly linear downshift in peak frequency with depth for typical parameters found in human abdominal ultrasound. In eqn (25) $f_0$ is determined by the round-trip impulse response and f sub max results from the scatterers within tissue. In some cases, there is no reference impulse response available and average spectra are sampled from a region of interest within tissue, and then curve-fit to a Gaussian spectrum. In that case, one can re-interpret eqn (25) with $f_{max}$ as the observed ensemble average peak and $\gamma$ implicitly as 0, thus the equation reduces to $$f_{max}(f_0, \sigma, x) = f_0 - \alpha\sigma_f^2 x, \qquad (26)$$

or as an estimate from plotting the data:

$$\hat{\alpha} = \left(\frac{\Delta f_{max}}{\Delta x}\right) \cdot \left(-\frac{1}{\sigma_f^2}\right) \qquad (27)$$

using the slope of $f_{max}$ versus depth. A linear downshift was first derived for attenuating media and a Gaussian pulse by (Kuc, 1984). For completeness, note there are many additional estimators for attenuation (Parker, 1983; Parker and Waag, 1983; Cloostermans and Thijssen, 1983; Parker et al., 1984; Maklad et al., 1984; Wilson et al., 1984; Parker and Tuthill, 1986; Parker, 1986; Taylor et al., 1986; Garra et al., 1987; Parker et al., 1988; Zagzebski et al., 1993; Girault et al., 1998; Fujii et al., 2002; Lee et al., 2012; Tai et al., 2019).

An inverse filter approach is used for compensation of attenuation. Once estimated by the downshift formulas, the inverse filter in the frequency domain is approximated as a real and even exponential increase as a function of frequency and depth. In practice, some upper band limit must be imposed to ensure finite energy and avoid unproductive amplification of noise. In the continuous domain, note that a practical, finite energy inverse filter $$Infil(\alpha, x, f, \sigma_f) = \exp(+\alpha x f)\exp\left(-\frac{f^2}{2\sigma_f^2}\right) \text{ for } f>0 \qquad (28)$$

will have positive amplification out to some frequency set by the $\sigma_f$ parameter, taken to be consistent with the transmit pulse's upper frequency range. If implemented as a time domain convolution, assumed to be a real and even function of time and frequency, the impulse response of this can be expressed in terms of Gaussian and erf functions, in which the complex terms appear as conjugates so the overall result is also real and even. In digital signal processing, this can be implemented as an IIR or an FIR discrete time filter of the sampled echoes.

Of course this inverse filter is depth-dependent, however the convolution for any increment of x can be repeated over subsequent increments of 2x, 3x, 4x, and onward since repeated convolutions in the time domain are equivalent to multiplications in the frequency domain, and $\exp(f \cdot \alpha \cdot x)^N = \exp(f \cdot \alpha \cdot N \cdot x)$ for real and positive values of the arguments.

Figure 11:
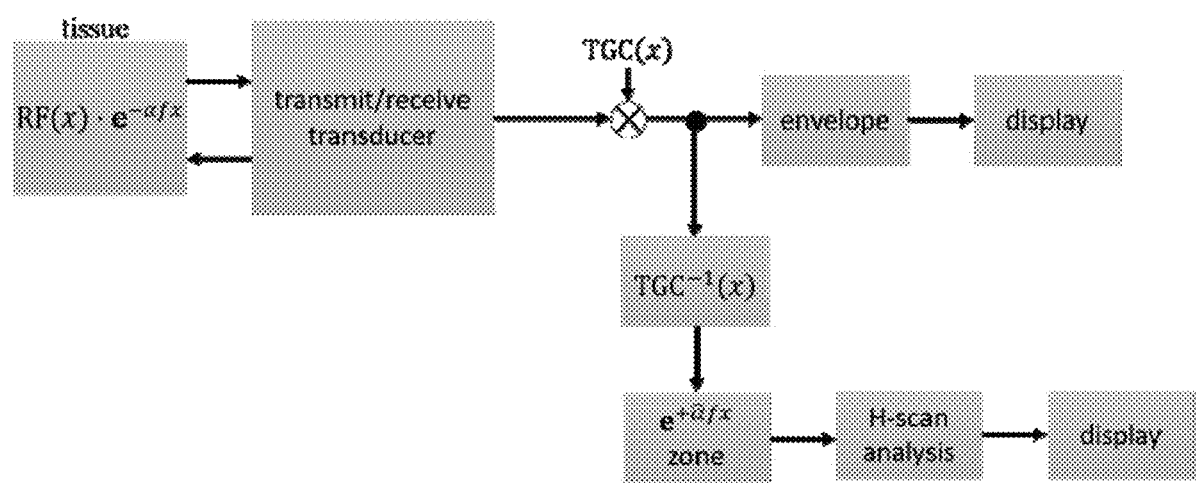
FIG. 11 is a schematic for attenuation correction according to one embodiment.

Methods for attenuation correction will now be discussed in more detail. The ultrasound signal is emitted from a transducer as shown in FIG. 11, and assume the RF echoes from tissue scatterers in the absence of attenuation would be RF(x), where x is the propagated distance from the probe. Due to the attenuation the received ultrasound intensity can be described as $RF(x) \cdot e^{-\alpha f x}$ where $\alpha$ is the attenuation coefficient in NP/cm/MHz and $f$ is frequency of ultrasound in MHz. The received ultrasound is compensated depending on depth in the time gain compensation (TGC) amplifier, which is a practical component of ultrasound systems. To reconstruct the transmitted signal when the gain function is not recorded, assume that the TGC was set to a function of depth that is proportional to $e^{+\hat{\alpha}_0 x}$ at the depth X and $\hat{\alpha}_0$ is an a priori estimate of attenuation in Np/cm. Therefore, the uncompressed ultrasound signal is reconstructed as $$RS(x) = RF(x) \cdot TGC^{-1}(x). \quad (29)$$

To compensate for frequency dependent attenuation, the transmitted signal can be reconstructed in frequency domain at some selected depth:

$$\Im\{RS(x)\} \cdot H(f), \quad (30)$$

where $H(f)$ is a frequency domain function to compensate for frequency-dependent attenuation. In this study, assume $H(f)$ is proportional to $e^{+\alpha_0 f x}$ within a defined ROI and spectral bandwidth. This is a depth-dependent filter, however to simplify the implementation, several zones are defined in the depth direction. Each zone has one nominal depth, $x_z$ for each zone z. The reconstructed transmitted signal results in:

$$\Im\{RS(x)\} \cdot H_z(f) = \Im\{RS(x)\} \cdot e^{\alpha f x_z} \quad (31)$$

for z={1, 2, . . . , n}, where n is the number of zones. The limited dynamic range of receiver amplifiers and noise floor will always present a limit as to how far in depth the correction can be taken. Similarly, the practical upper limit of the pulse bandwidth in eqn (24) may require an upper limit to the inverse filter as given in eqn (21).

Figure 12A:
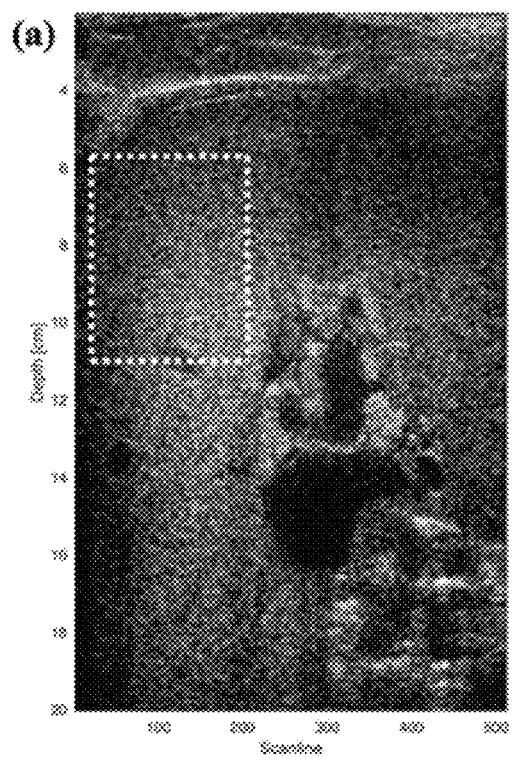
FIG. 12A, FIG. 12B, and FIG. 12C show images and analysis of attenuation-corrected spectra across four zones according to one embodiment.
Figure 12B:
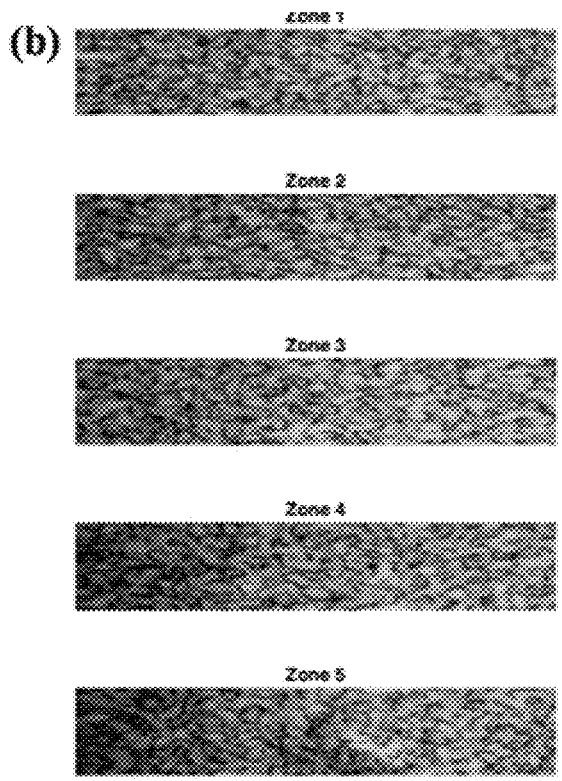
Figure 12C:
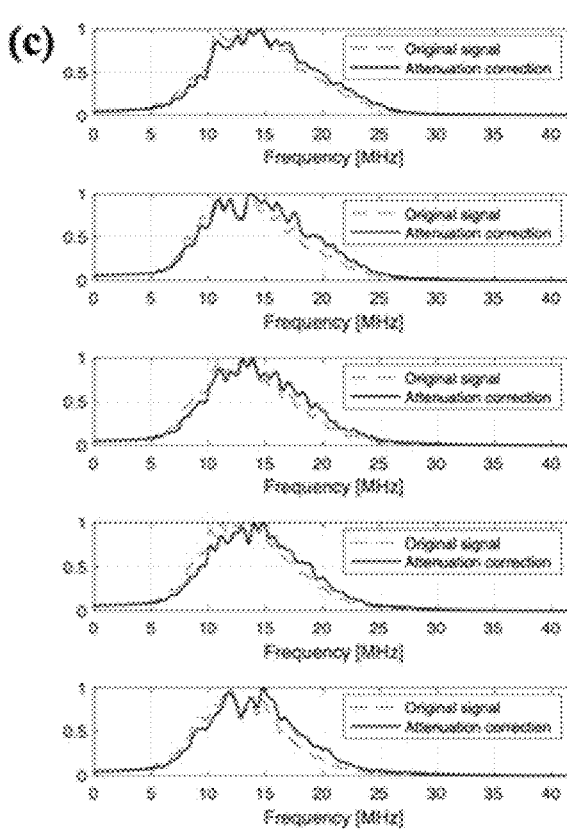

For attenuation correction one estimated attenuation coefficient was used for the same target when multiple scans were performed. To estimate the attenuation coefficient, the frequency spectrum can be modeled using Gaussian pulse and attenuation of ultrasound, in accord with eqn (25)-(27). To eliminate depth variable in frequency domain spectrum, this study divided ultrasound signal into several depth region, for example it can be four zones along the axial direction, as shown in FIG. 12A, FIG. 12B, and FIG. 12C.

Figure 13:
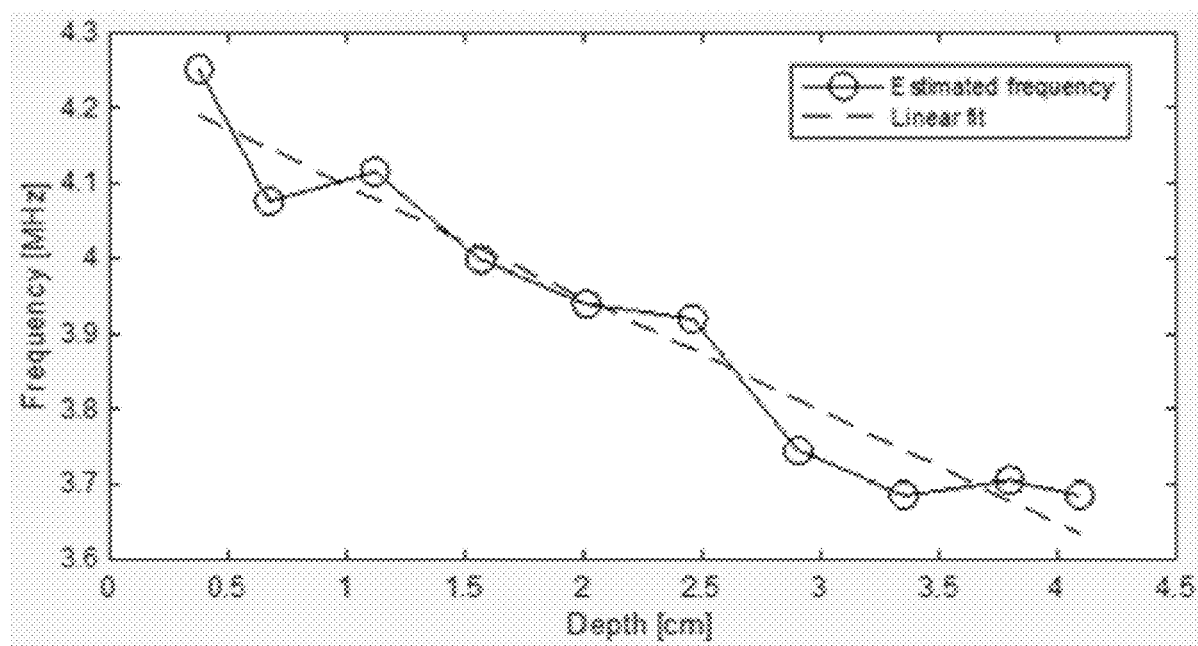
FIG. 13 shows an estimated peak frequencies corresponding to each zone according to one embodiment. The linear fit of this curve is obtained, which can be used to calculate the estimated attenuation coefficient.
Figure 14A:
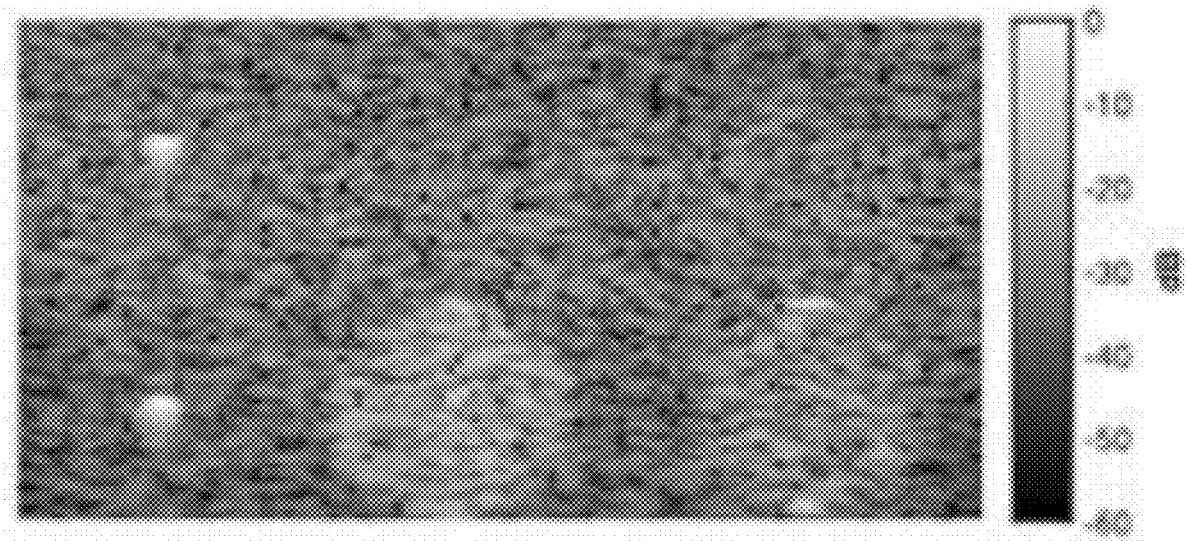
FIG. 14A shows an input ultrasound image according to one embodiment.
Figure 14B:
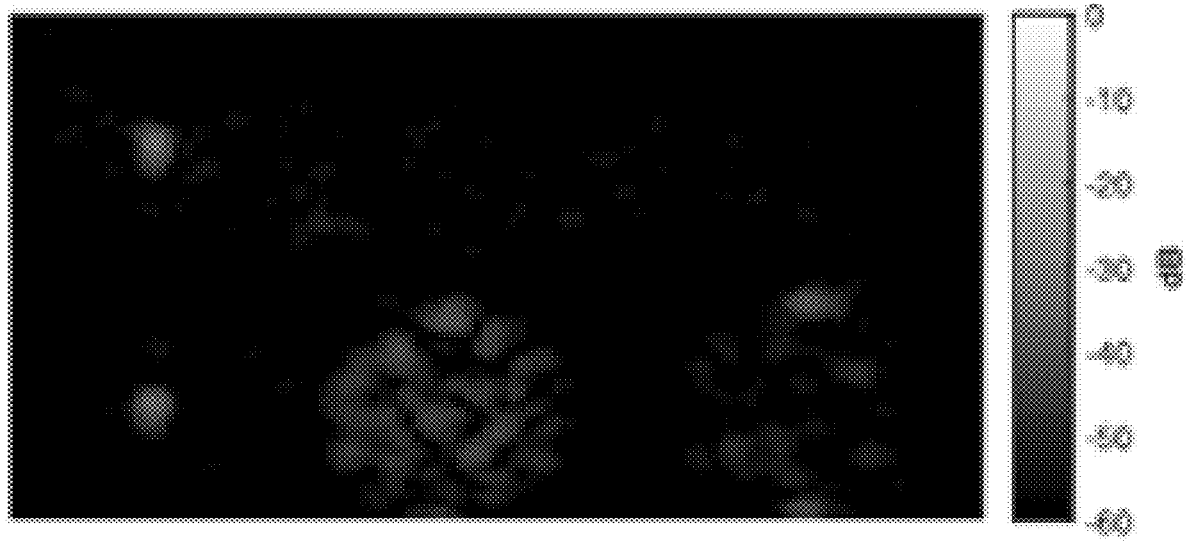
FIGS. 14B, 14C, 14D, 14E and 14F are convolution images with five different matched filters, whose peak frequencies are 1.4, 3.1, 4.7, 6.3, and 7.9 MHz. The smallest peak frequency filter in (b) highlights the largest structures in the phantom. The largest frequency filter of (f) tends to enhance the smallest speckle structure in the ultrasound image.
Figure 14C:
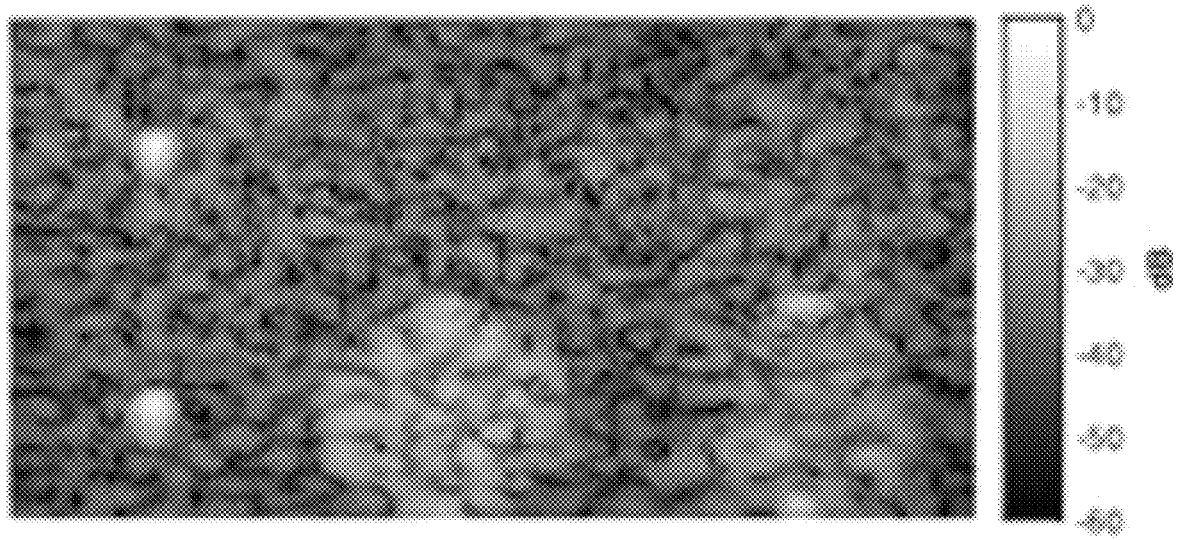
Figure 14D:
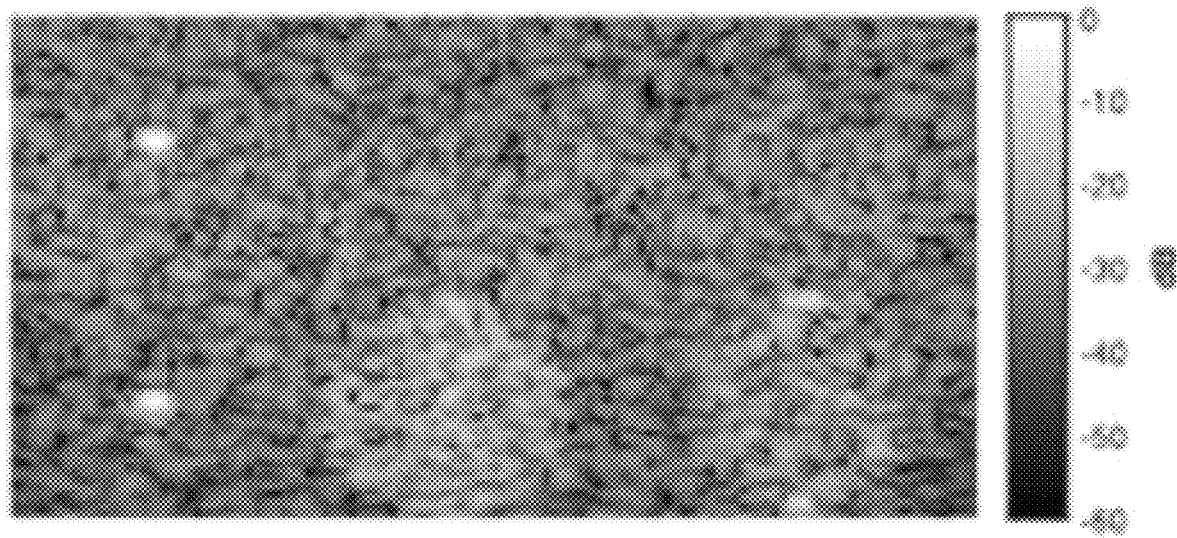
Figure 14E:
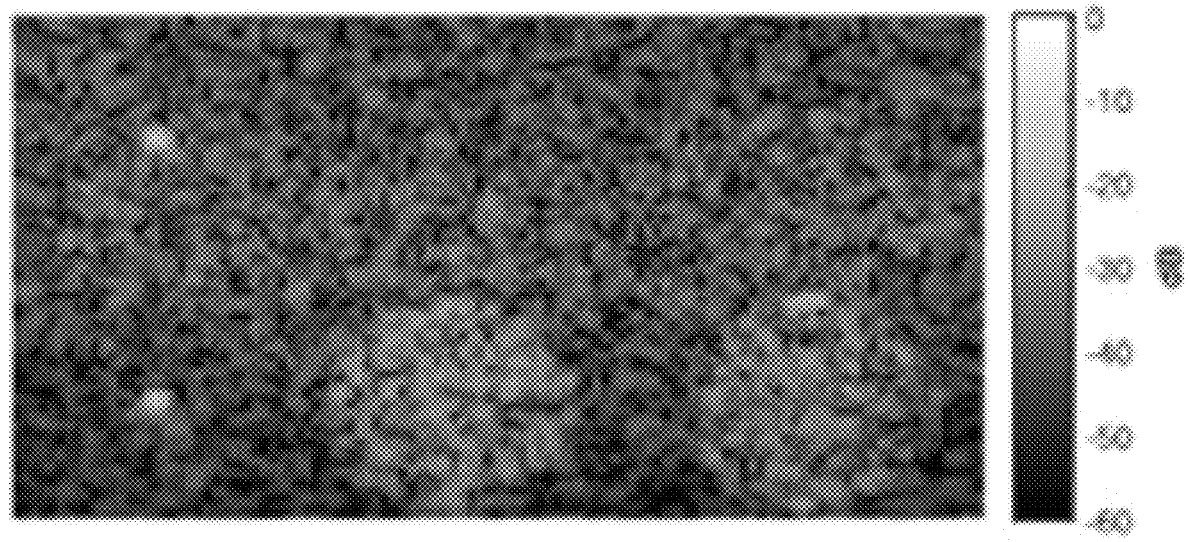
Figure 14F:

The estimates of $\alpha_z$, the attenuation coefficient of zone z, is derived from the slope of $f_{max}$ versus depth. To obtain $\alpha_z$ in this equation, peak frequency for each zone is estimated using frequency spectrum, which is the Fourier transform of ultrasound signal in time domain from each zone. By selecting the maximum value of the smoothed frequency spectrum, the peak frequency for each zone can be estimated, and subsequently a linear fit of peak frequency vs. depth is calculated according to eqn (26) and eqn (27), this is shown in FIG. 13.

Figure 15:
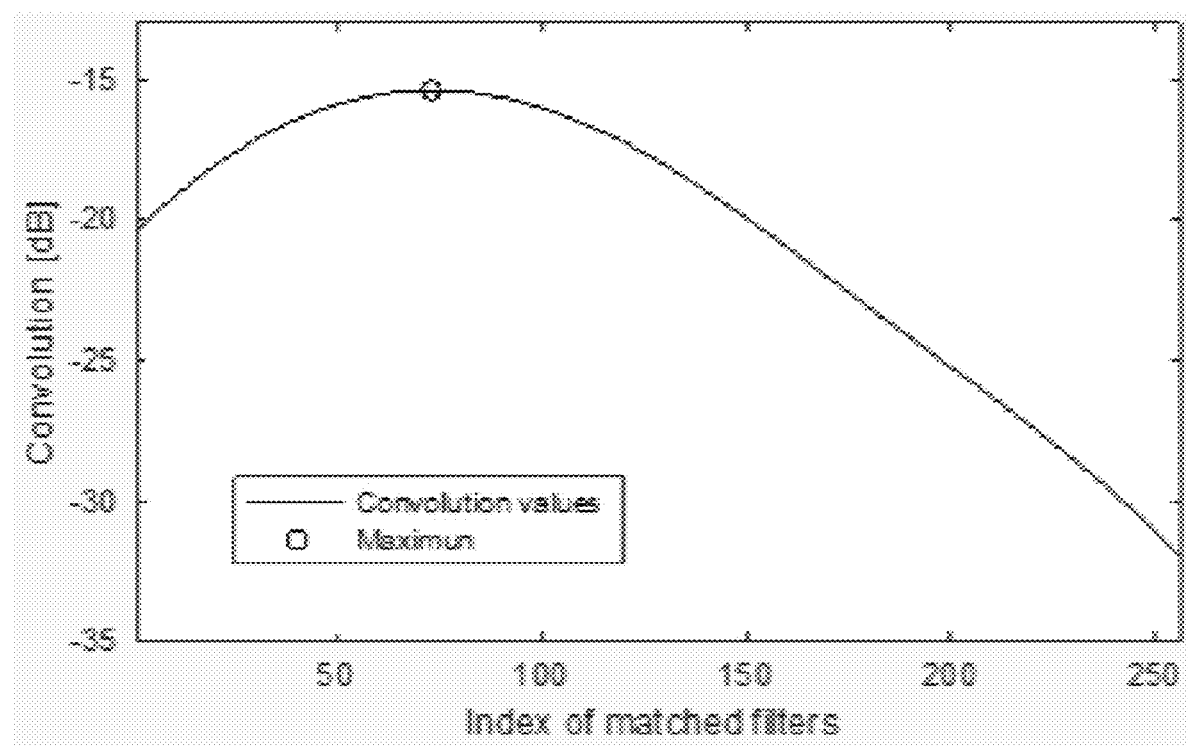
FIG. 15 shows convolution values for a pixel in ultrasound image according to one embodiment. 256 filters were used to get convolution images.

The H-scan concept is based on convolution with matched filters corresponding to specific sized scatterers. In FIG. 15, five different matched filter with different peak frequency were used to obtain convolution images of a phantom, using a 6.4 MHz center frequency transducer. The filters with the smallest peak frequency in FIG. 15(b) highlighted the target strings in the phantom that is larger structures; otherwise, FIG. 15(f) enhanced smaller sized speckles.

In ultrasound images, scatterers from small to large can correspond from smaller speckles to larger structures in human body. When using different filters, various sized structures in human body can be matched to specific filters. In this study, Gaussian bandpass functions with 256 peak frequency were used to obtain convolution between the Gaussian functions and ultrasound echoes RF(x). These correspond to eqn (20)-(22), where $f_0$ is taken as 4.7 MHz and $f_{max}$ ranges from 1.4 to 7.9 MHz for the case shown in FIG. 14. The frequencies $f_0$ and $f_{max}$ are set depending on the spectrum of the input signal. Thus, each pixel in ultrasound image has a corresponding set of 256 convolution values, as shown in FIG. 15, from which a maximum is selected according to the concept of a matched filter. In our experience, these 256 outputs for each pixel have single maximum; in other words, multiple peaks are unlikely to be observed from soft tissue echoes.

After attenuation correction, the convolution with Gaussian functions is examined to generate H images, which are specific frequency range enhanced signals; in H1, the lowest frequency range signal is amplified, and the highest frequency is enhanced in H256. The selected indices for each pixel correspond to color map ranging from 1 to 256 RGB colors. Using transparency overlays to combine the color and B-mode data, the final H-scan image can be displayed, as described below.

To enhance visualization, a color map for H-scan is proposed, corresponding to the maximum output selected from the matched filter bank. This color map can also be thought of as a way to show the instantaneous frequency of each pixel in an ultrasound image.

Figure 16:
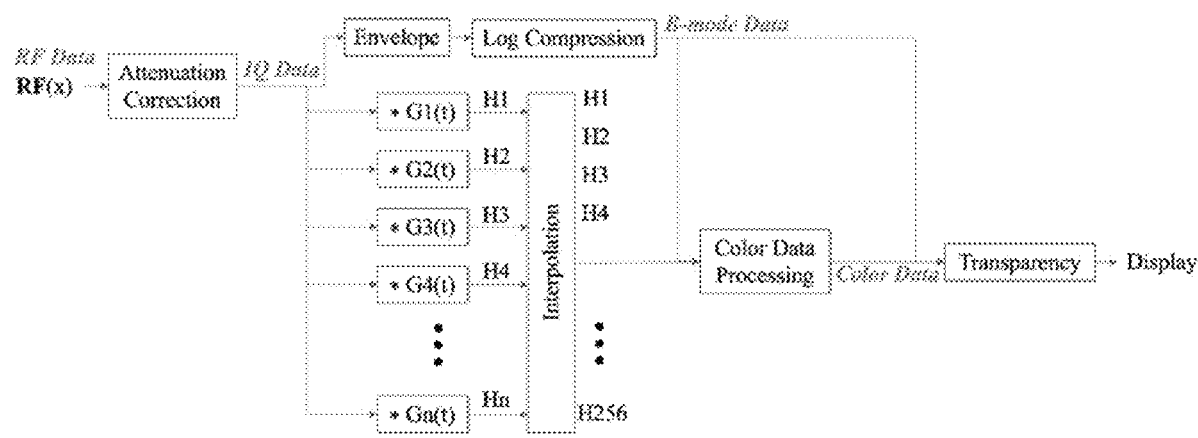
FIG. 16 shows a schematic for H scan according to one embodiment.

A flow chart of H-scan is shown in FIG. 16. Attenuation corrected convolution images are assigned as input data for color map processing, which generates H scan color map. By combining traditional B-scan and H-scan color map data, transparency of the two data displays H-scan image; the B-mode contains the highest spatial resolution, and the color map corresponds to peak frequency components.

A color map of 256 levels is set for H scan; the levels 1 to 256 correspond from red to blue colors, sequentially, as shown in FIG. 17. After the convolution process, each pixel has one maximum matched filter output determining a specific color map level among 256, as described in FIG. 17.

H-scans with attenuation correction were obtained from in vitro and in vivo studies. To evaluate the performance of the proposed attenuation correction method, a tissue mimicking phantom (CIRS 040GSE, Computerized Imaging Reference Systems, Norfolk, VA, USA) was used. This phantom has two zones with higher and lower attenuation, whose attenuation coefficients were 0.5 and 0.7 dB/cm/MHz. For this phantom study, a Verasonics ultrasound scanner (Verasonics, Kirkland, WA, USA) with a linear array transducer (L7-4, ATL, Bothell, WA, USA) acquired RF signal at the center frequency of 5-MHz and 6.4-MHz for plane wave and focused wave, respectively. Coherent plane-wave compounding (Montaldo et al., 2009) were implemented to obtain beamformed RF data.

For in vivo studies, rat and mouse liver data were used and there are three kinds of data: normal, hepatic fibrosis, and cancerous. For the hepatic fibrosis data, a Vevo 2100 (VisualSonics, Toronto, Canada) with a 21 MHz center frequency linear transducer (MS 250) was used to scan one normal and three fibrotic rats. Separately, a spontaneous murine model for cholangiocarcinoma (Han et al., 2019) was imaged using the Vevo 3100 (VisualSonics, Toronto, CA) with a 32 MHz center frequency linear probe (MX 550D) was used. Finally, a liver metastasis model (Soares et al., 2014; Ahmed et al., in press), a normal and a cancerous mouse were scanned, and a Verasonics (Vantage-256, Verasonics, Kirkland, Wash., USA) was used with L11-5v probe at 10 MHz center frequency. The VisualSonics scanner used focused beam transmission and the Verasonics used plane wave transmission. All in vivo animal studies were reviewed and approved by the University Committee on Animal Resources at the University of Rochester or the sponsoring institution.

To evaluate the performance of H scan, intensity-weighted percentage of blue ($IWP_{blue}$) and red ($IWP_{red}$) were defined as follows:

$$(IWP_{blue}) = \frac{\Sigma_{i \in B} I_i}{\Sigma_{i \in B} I_i + \Sigma_{i \in R} I_i} \times 100\% \qquad (32)$$

$$(IWP_{red}) = \frac{\Sigma_{i \in R} I_i}{\Sigma_{i \in B} I_i + \Sigma_{i \in R} I_i} \times 100\%,$$

where i is index of each pixel in B-mode image and $I_i$ is normalized color intensity for i. The indices, $i \in B$ and $i \in R$, are pixels classified as blue and red, respectively.

Our color map ranges from 1 to 256; the range of 1 to 128 represents red, and that of 129 to 256 represents blue. The extreme color map indices of 1 or 256 correspond to saturated red (lowest frequency) or blue (highest frequency), respectively, so that red and blue can be normalized as $I_i$. To normalize the color data raging from 1 to 256, the red colors from 128 to 1 are re-assigned to 0 to 1 in sequence, and the blue colors from 129 to 256 are set to 0 to 1, which is given by:

$$I_i = \frac{C_i - 129}{127}, \qquad (33)$$

where $C_i$ is the color map for the ith pixel for blue data, and $$I_i = \frac{128 - C_i}{127} \qquad (34)$$

for red data.

Figure 18A:
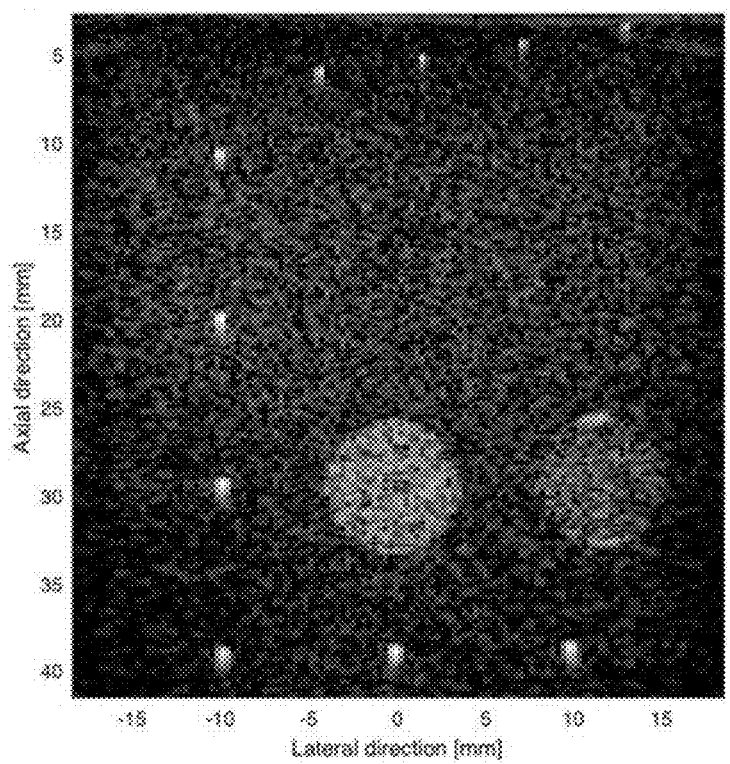
FIG. 18A shows results of an H scan correction for phantom (nominally 0.7 dB/MHz/cm attenuation) (Verasonics L7-4, 5 MHz plane wave transmission frequency) in traditional B-mode.
Figure 18B:
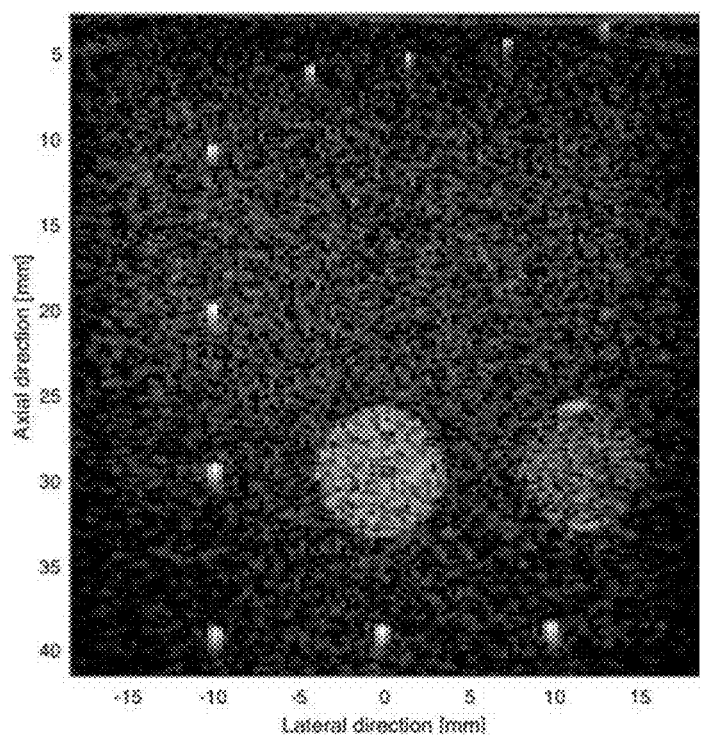
FIG. 18B shows B-mode after attenuation correction.
Figure 18C:
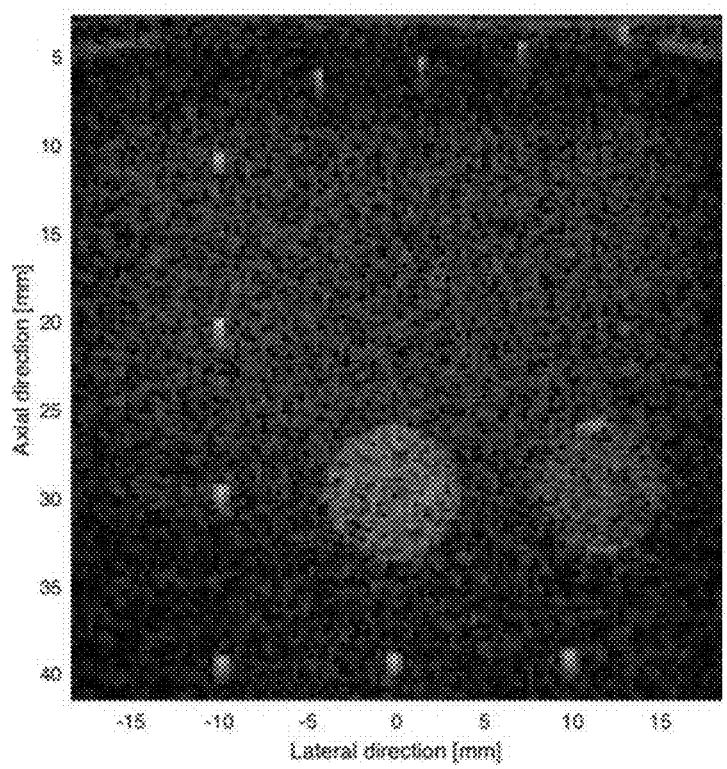
FIG. 18C shows H scan.
Figure 18D:
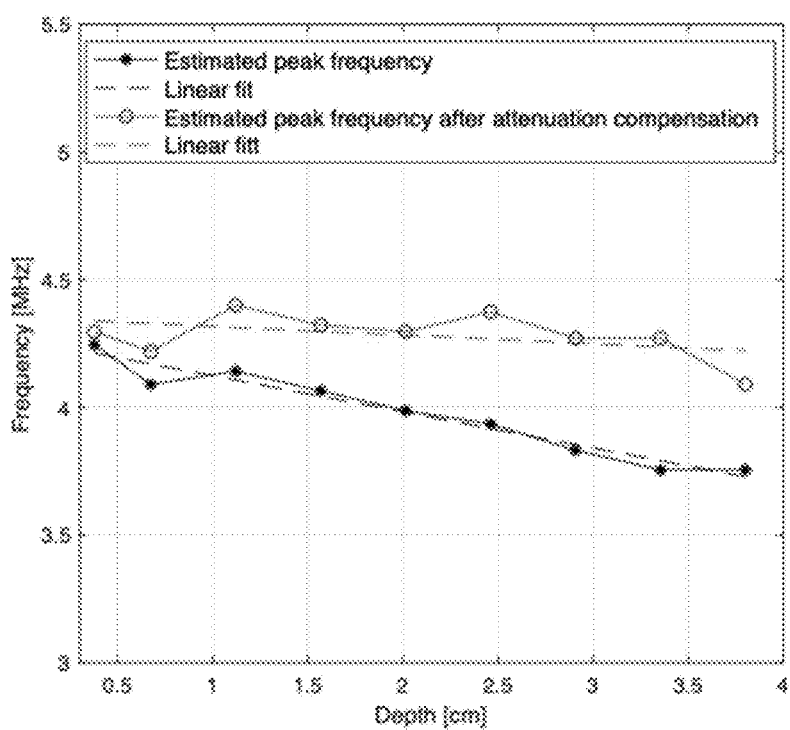
FIG. 18D shows Estimated center frequency along imaging depth and fitting curve according to one embodiment.
Figure 18E:
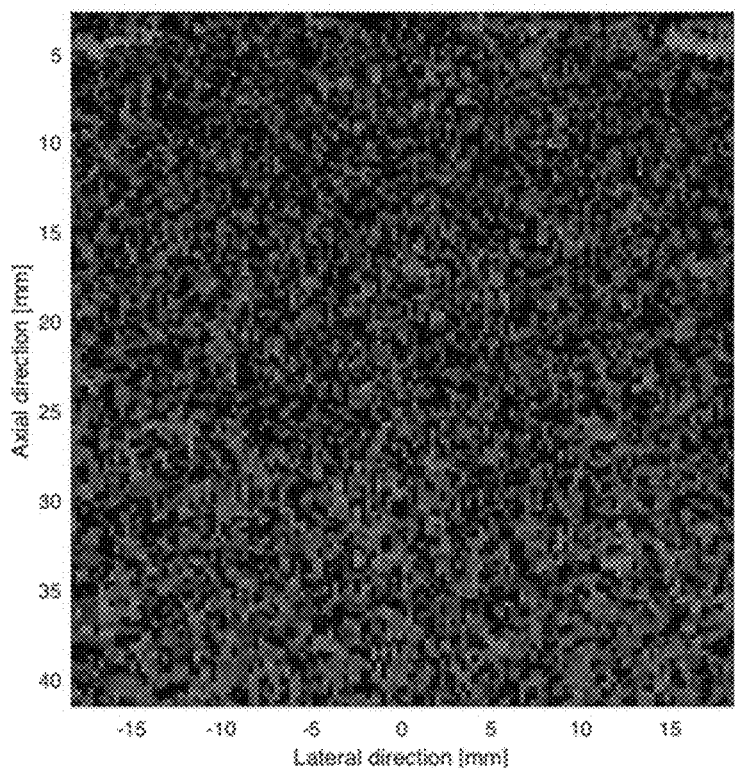
FIG. 18E shows H scan color map for traditional RF signal.
Figure 18F:
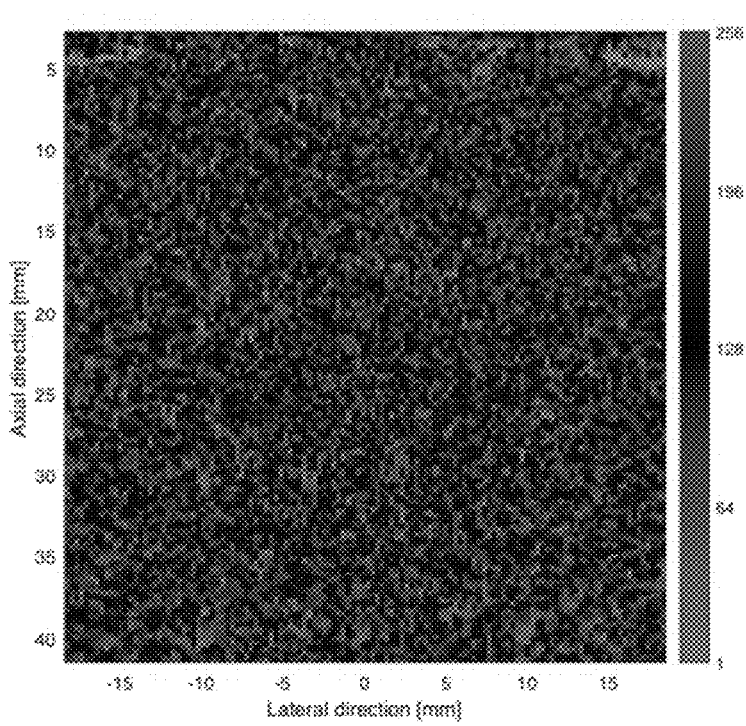
FIG. 18F shows H scan color map for attenuation corrected RF data.
Figure 18G:
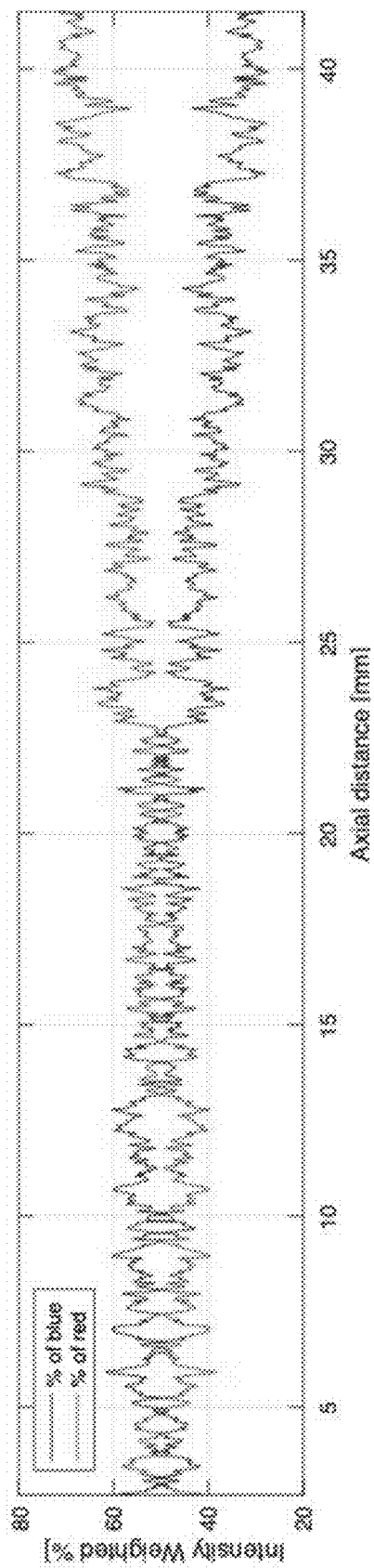
FIG. 18G shows Intensity weighted percentage of blue and red without attenuation correction.
Figure 18H:
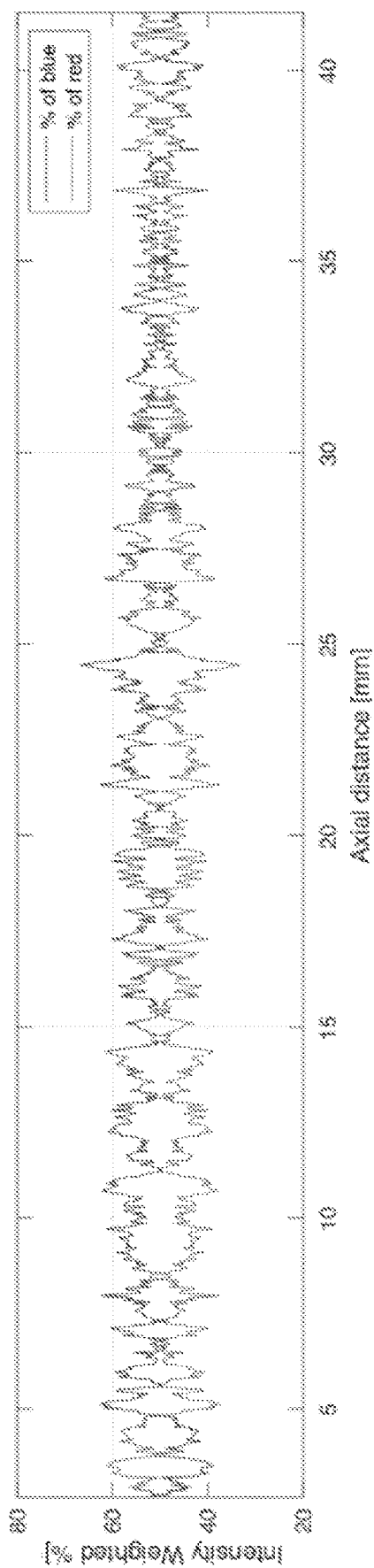
FIG. 18H shows Intensity weighted percentage of blue and red with attenuation correction.
Figure 19A:
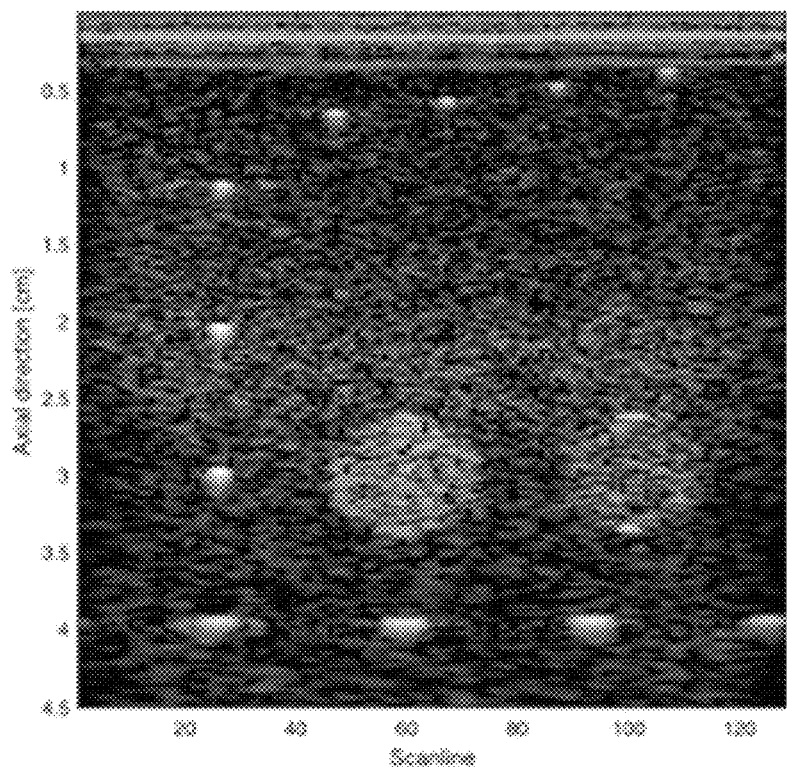
FIG. 19A shows a B-scan of phantom, 6.4 MHz focused transmit.
Figure 19B:
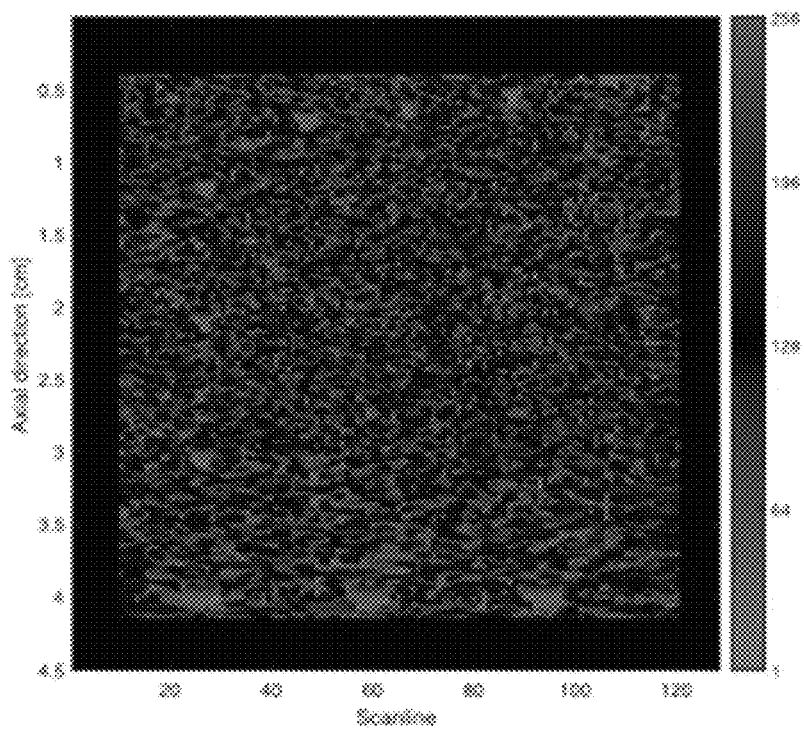
FIG. 19B shows a H-scan color map of phantom, 6.4 MHz focused transmit.
Figure 19C:
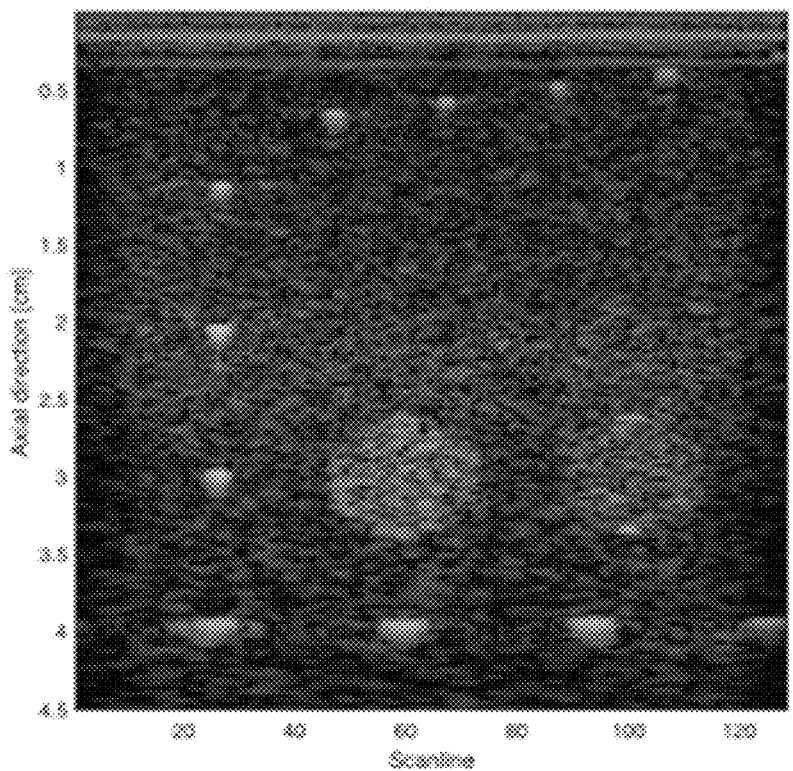
FIG. 19C shows a H-scan image.
Figure 19D:
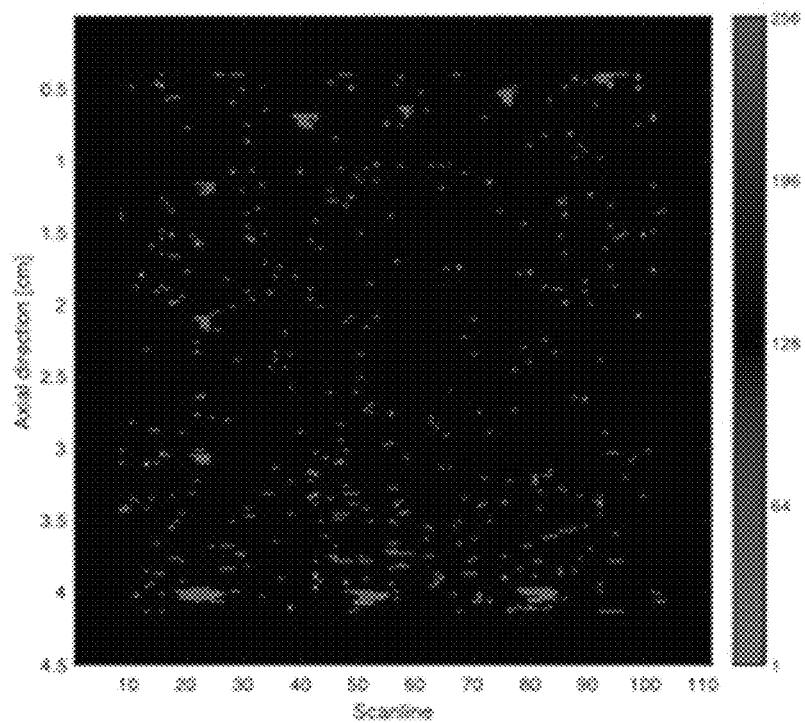
FIG. 19D shows a H-scan color map with threshold to show red pixels ranging from 1 to 55 color map levels, which are corresponding to relatively larger scatterers in B scan according to one embodiment.
Figure 20A:
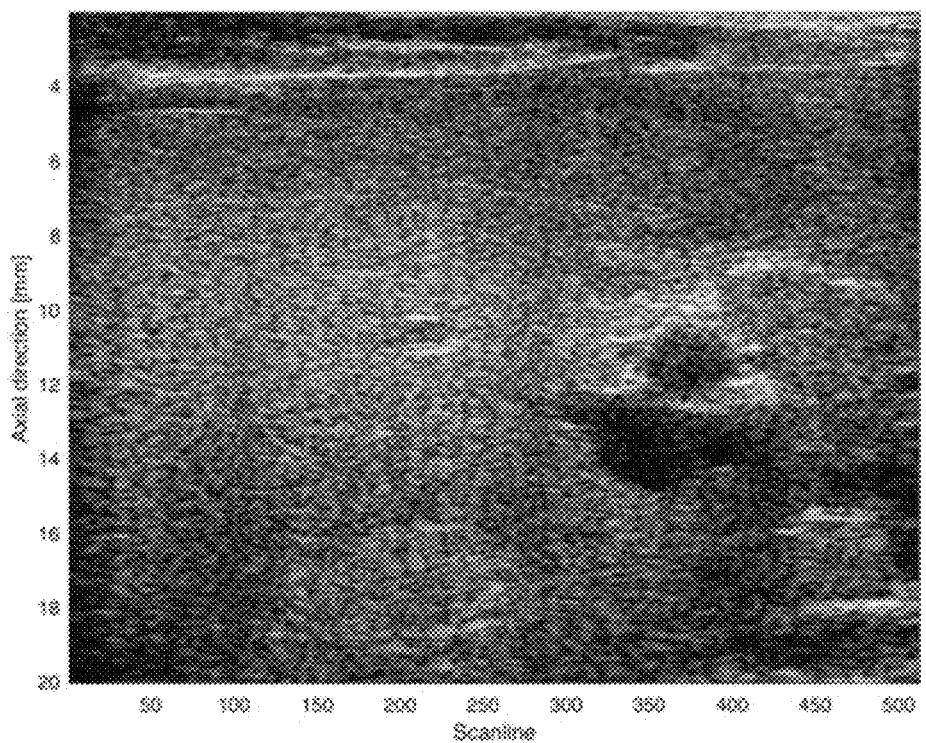
FIG. 20A shows rat liver data in B-mode.
Figure 20B:
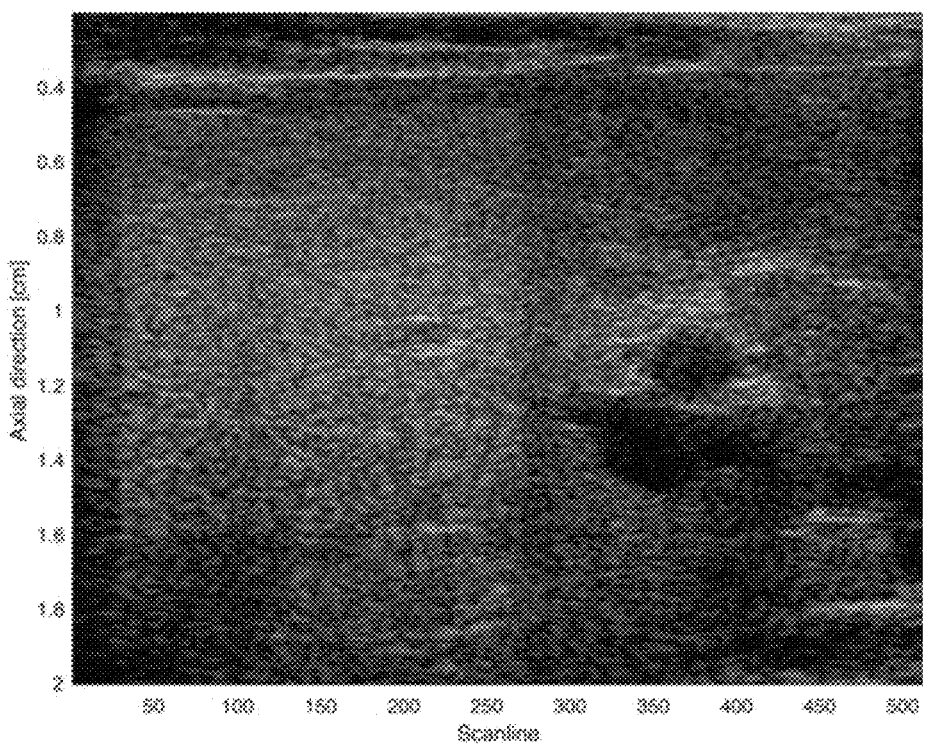
FIG. 20B shows H-scan without attenuation correction.
Figure 20C:
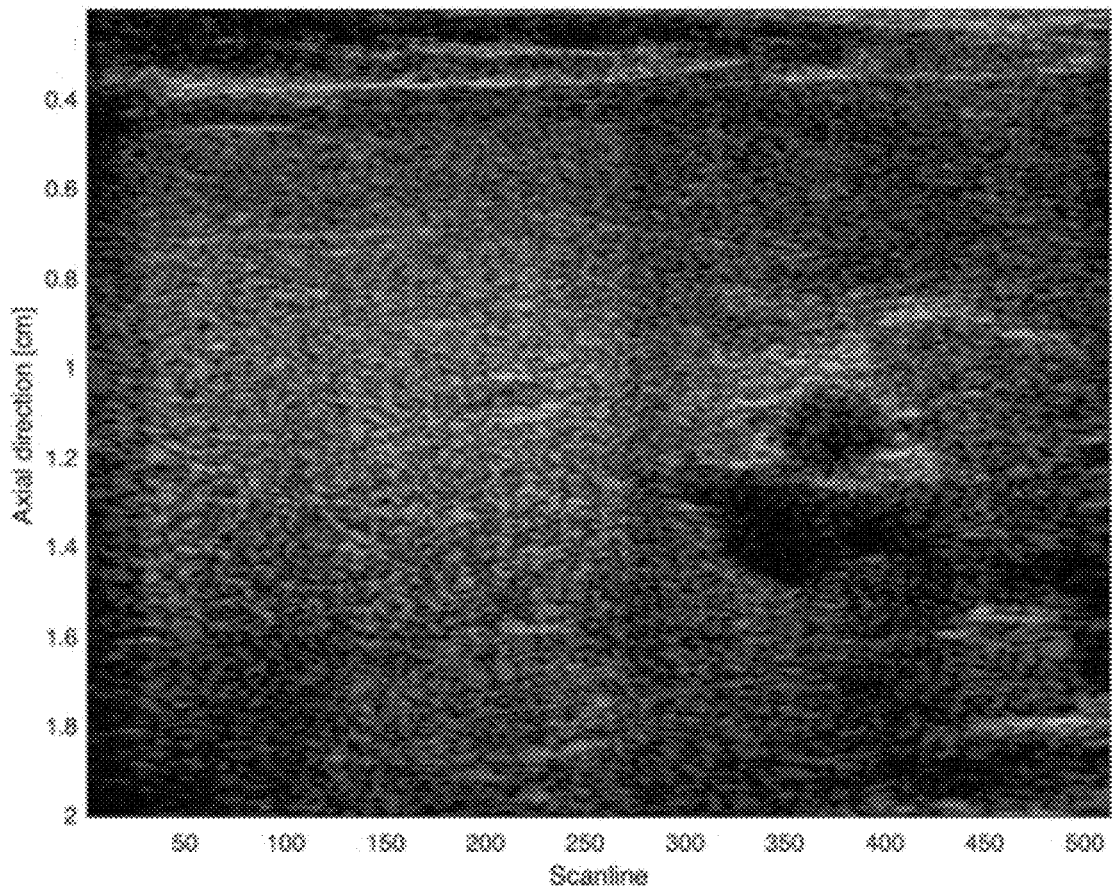
FIG. 20C shows H-scan after attenuation correction.
Figure 20D:
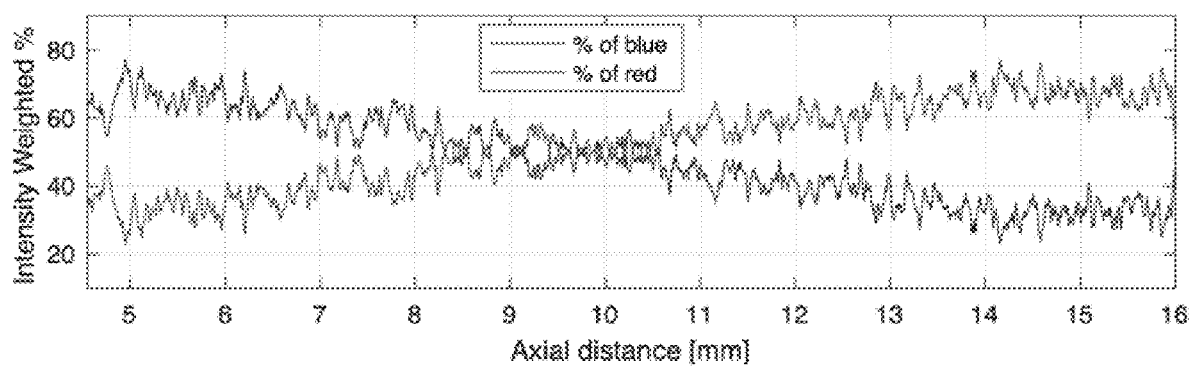
FIG. 20D shows intensity-weighted percentage of blue and red without attenuation correction.
Figure 20E:
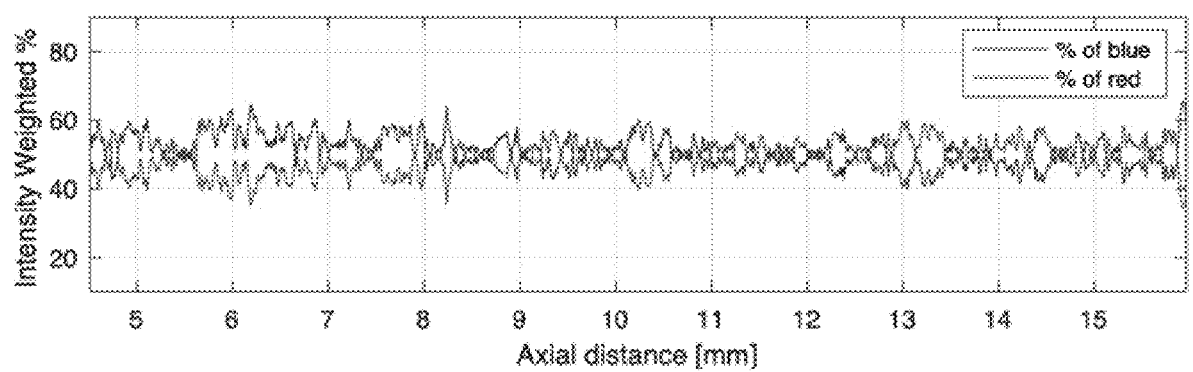
FIG. 20E shows intensity-weighted percentages with attenuation correction according to one embodiment.
Figure 21A:
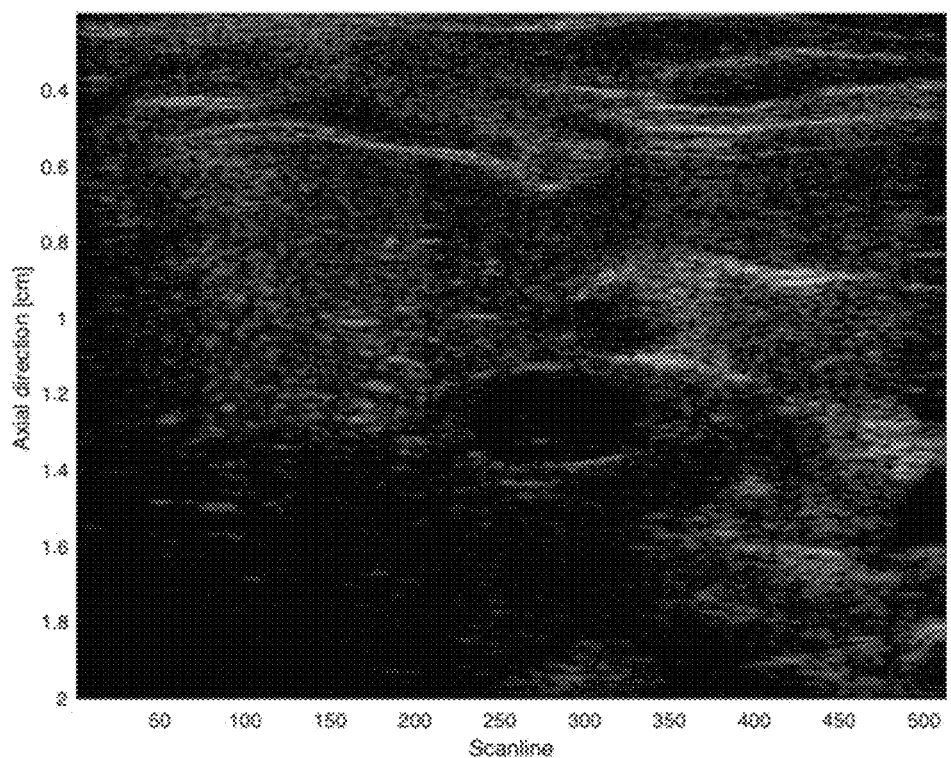
FIG. 21A-D show an H-scan of normal and abnormal rat, the upper row and lower row data are the results of normal and hepatic fibrosis rat, respectively according to one embodiment.
Figure 21B:
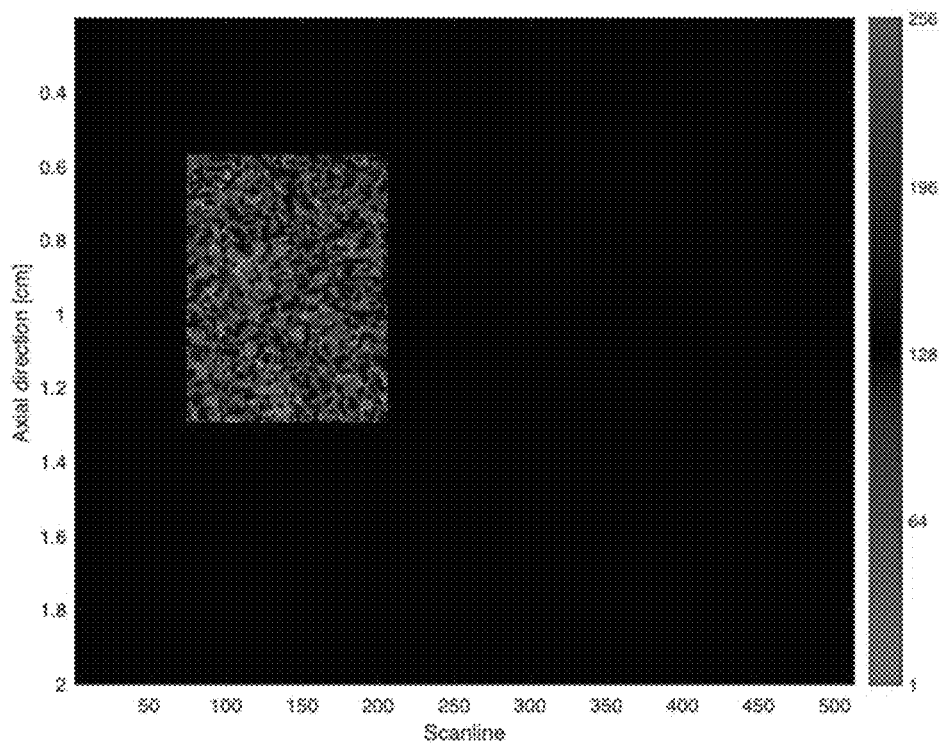
Figure 21C:
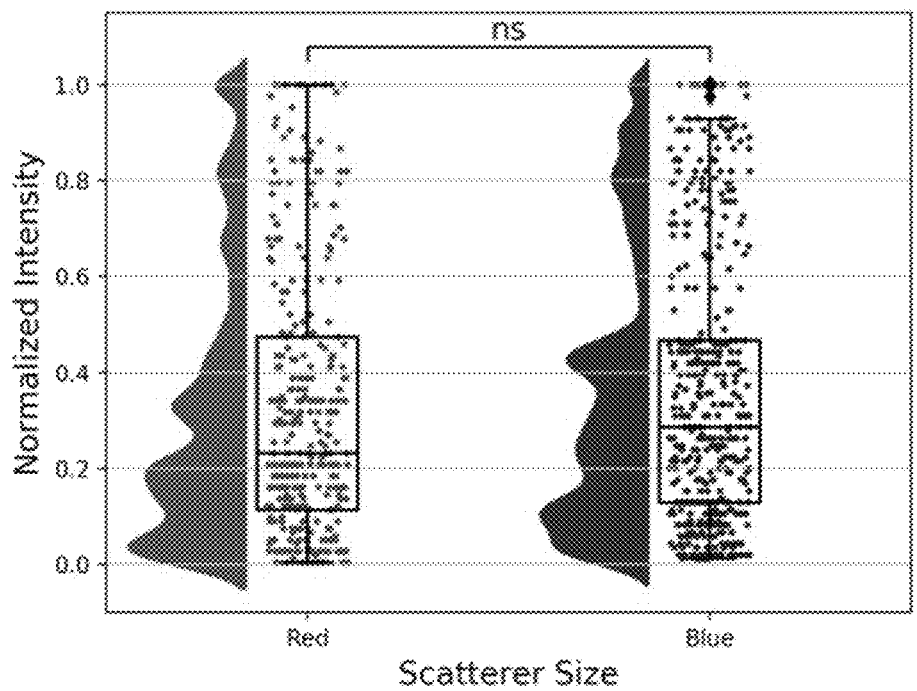
Figure 21D:
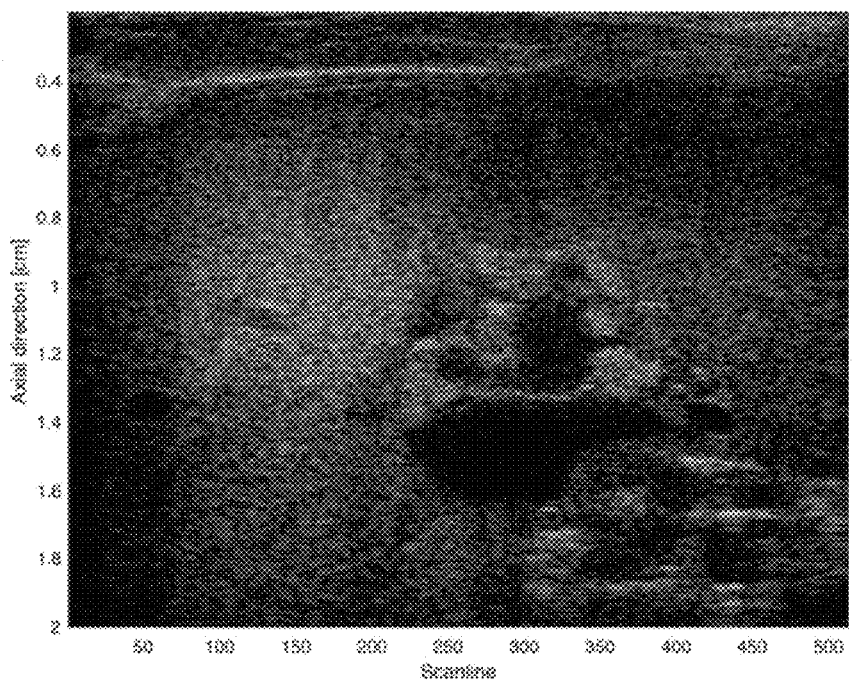
Figure 21E:
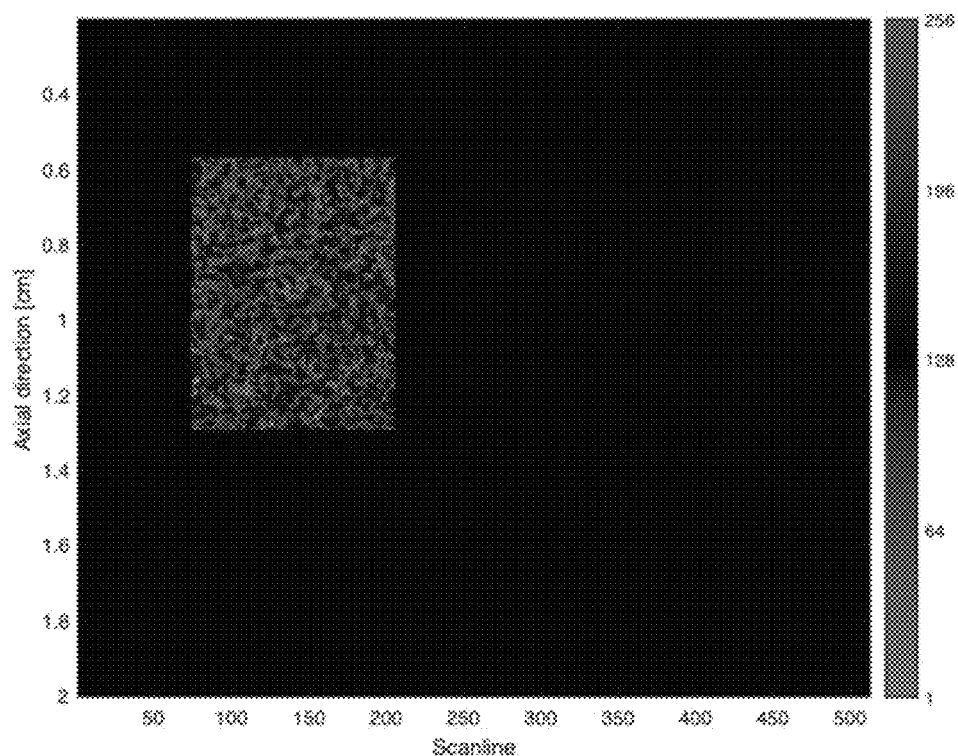
Figure 21F:
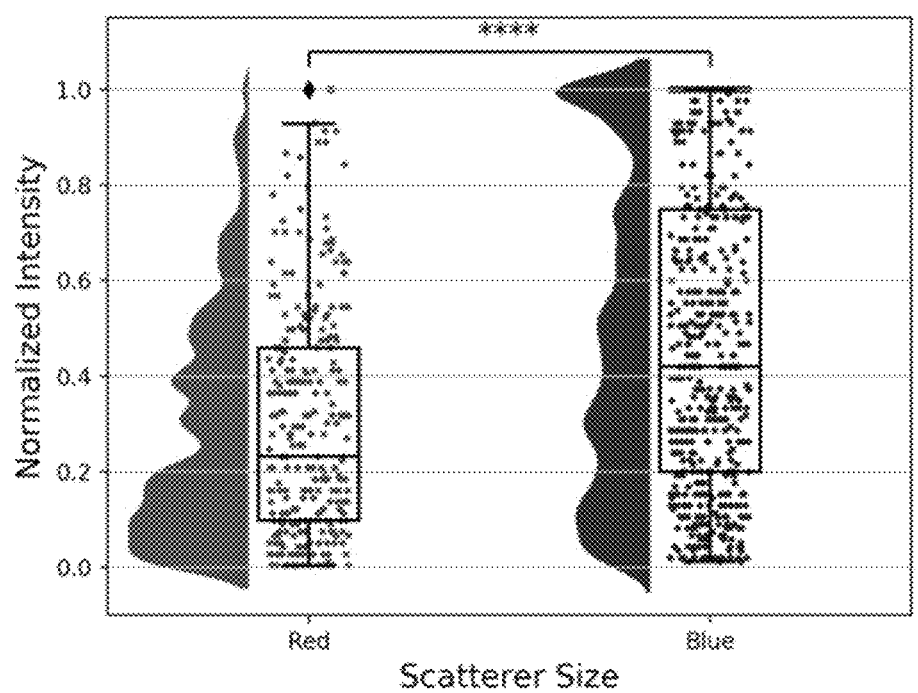

In the phantom study, the attenuation correction method was evaluated using estimated peak frequency and H-scan results. Traditional B-mode image and B-mode after attenuation correction for the phantom are seen in FIG. 18(a) and (b), respectively. Their peak frequencies were estimated for ten depth zones in FIG. 18(d). B mode image has frequency down shift along depth; otherwise, the down shift after attenuation correction is compensated, resulting in more flat linear fit of estimated frequency. FIG. 18(e) and (f) show H scan color map without and with attenuation correction, respectively. More red pixels in far depth are investigated when attenuation correction is not used for H scan in FIG. 18(e). After using the attenuation correction method, red and blue pixels are more uniformly distributed over entire depth, as shown in FIG. 16(f). Intensity weighted percentage of blue and red were averaged for depths and it is presented as a function of depth; FIG. 16(g) and (h) represent the percentages for the method without and with attenuation correction, respectively. In FIG. 18(g), red pixel percentage gradually increases, and blue pixels decrease: due to the frequency down shift. However, in FIG. 18(h), the percentage of blue and red pixels are similar along with the depth, meaning that frequency attenuation effect is compensated by using the proposed attenuation correction method. As a result, FIG. 18(c) represent regularly distributed red and blue colors regardless of depth in H scan image.

H-scan results for phantom are shown in FIG. 19; this phantom was scanned using focused beam transmission with 6.4 MHz center frequency. Wire targets in the phantom have more red color than the background speckle since the size of the wire targets is larger than the background scatterers. To show the H-scan result more clearly, FIG. 19(d) used threshold in color map, which shows red colored pixels with color map values ranging from 1 to 55. The clustered red colors are positioned at wire targets in the phantom.

An in vivo scan of a rat liver with grade 4 hepatic fibrosis represents color difference between H-scan images without attenuation correction and after attenuation correction in FIG. 20. FIG. 20(b) shows the frequency down shift: more blue pixels in near depth, and more reds in the more distal region. However, after correction the H-scan color distribution in FIG. 20(c) is not dependent on depth, demonstrating attenuation is compensated properly, which is consistent with phantom results. The % of blue and red profile along with the depth in FIG. 20(d) is altered due to the attenuation effect; on the other hand, after the attenuation correction, the blue and red percentage distribution becomes more uniform as shown in FIG. 20(e).

The attenuation correction method allows us to correct for color change caused by the frequency down shift; therefore, color difference is likely to come from variation of tissue characteristics. For example, a spontaneous murine tumor is normally poorly differentiated from normal tissue because of the shift to more red colors at depth caused by attenuation. After applying an attenuation correction, tumor cells appear in more red than normal tissues at the same axial depth.

Murine and rat in vivo studies demonstrate H-scan visualizations within normal, hepatic fibrosis, and cancerous tissues. To compare hepatic fibrosis and normal liver, the same color box for H-scan was set at the same depth in FIG. 21. To compare the color and percentage, the H-scan process used the same Gaussian function set for convolution in the FIG. 21 case. FIG. 21 shows obvious color difference between the cases; H-scan results with hepatic fibrosis contain more blue than the other tissues. The hepatic fibrosis case has 61.5% of the intensity-weighted blue percentage, which represents the smaller scatterer percentage; on the other hand, normal rat has 51.9%. According to the FIG. 21(c) and (f), the hepatic fibrosis case represents a greater difference of distribution between the red and blue pixels in H-scan. For the normalized intensity, the mean value differences between red and blue are 0.18 and 0.03 for hepatic fibrosis and normal tissue, respectively. The p-value between the red and blue scatterer groups for hepatic fibrosis is $1.0597 \times 10^{-10}$, which is smaller than the p-value of 0.1973 for normal, meaning that hepatic fibrosis has more significant difference.

The deterministic assessment of transfer functions from different classes of scatterers has led to a generalization in terms of a simple power law function, whereby shifts in the scattering size or type lead to shifts in the power law. Integer orders of power law 0, 1, and 2, correspond to an all-pass filter, a derivative, and a second derivative, respectively, and structures with these behaviors are easily constructed in the laboratory and may be approximated in tissues under certain conditions (Parker, 2016a). Fractional power laws above and below 1 may correspond to a physiological range of fluid filled vessels modeled as cylinders. While the exact solution for an ideal cylinder is complicated, the narrowband slope for $k\alpha<1$ is more easily characterized by power law behavior. This is consistent with a first order expansion, or Taylor's series expansion in log-log space around some frequency. In the long wavelength (Rayleigh scattering) regime the power law is 2, frequency squared. As $k\alpha$ increases towards unity the slope decreases, ultimately towards zero as shown in FIGS. 9(b) and (d) for two different models of cylinders. The H-scan matched filters can be arranged so as to detect some shifts in the transfer function.

A logical question involves the minimum sensitivity of the matched filters to subtle shifts in tissue structures. The shift in peak frequency as a function of power law γ and other factors is given by eqn (19) and (22) for the case of a $GH_4$ pulse and a Gaussian pulse, respectively. Also, the functional dependence of the power law α on the cylinder radius is maximum in the long wavelength limit where transfer functions are proportional to frequency squared. Using the chain rule of calculus, for a Gaussian pulse, one yields:

$$\frac{\partial f_{max}}{\partial a} = \frac{\partial f_{max}}{\partial \gamma}\left(\frac{\partial \gamma}{\partial a}\right). \quad (35)$$

The first term on the right can be simply obtained for our specific cases by differentiation of either eqn (19) or (22) for $GH_4$ or Gaussian bandpass models. For example, from eqn (19) yields:

$$\frac{\partial f_{max}}{\partial \gamma} = \frac{1}{2\sqrt{2}\,\pi\tau\sqrt{4+\gamma}}. \quad (36)$$

The second term $(\partial\gamma/\partial\alpha)$ is more complicated since γ is a power law fit, but the derivative with respect to α is linear. However, from FIGS. 9(b) and (d) observe that the slope in log-log space is 2 at low kα and then slowly decreases to 0 near kα=1. In the important subresolvable zone near kα=0.1 or 0.2, find from numerical methods that $\partial\gamma/\partial\alpha$ is in the range of k/4 (units of 1/length). Using this yields:

$$\frac{\partial f_{max}}{\partial a} \cong \frac{k}{8\sqrt{2}\,\pi\tau\sqrt{4+\gamma}} \text{ for } 0.1 < ka < 0.2. \quad (37)$$

Now examining the case where the peak frequency was 6 MHz≅√2/πτ, and γ near 2:

$$\frac{\partial f}{\partial a} \cong \left(\frac{k}{16}\right)(6)\left(\frac{1}{\sqrt{4+2}}\right) \quad (38)$$

$$\cong \left(\frac{2\pi 6\times 10^6 \text{ rad/s}}{1.5\times 10^9 \text{ μm/s}}\right)(6 \text{ MHz})\left(\frac{1}{\sqrt{6}}\right)$$

$$\cong 0.01 \text{ MHz/μm}$$

This result is consistent with the findings published previously (Khairalseed et al., 2017), where changes in scatterer radius on the order of 10 μm were separated by a set of 4 H-scan filters.

Limitations of this study include the effect of noise on the performance of the matched filters. As can be inferred from FIGS. 15, 16 and 17, there can be substantial overlap in the spectra of neighboring matched filters, however from eqn (35)-(38), it's desirable to have fine grain sensitivity to changes in the scattering transfer function. Broadband noise can degrade the correct choices of a matched filter bank by adding uncorrelated and random components to the signal. These interactions and their parameterization are left for future study, however it can be concluded generally that the accuracy of selecting the correct matching filter will degrade as the signal-to-noise ratio decreases. Another limitation of this study is the reliance on power law transfer functions. As shown in FIG. 9(b), the transfer function from a long cylindrical vessel can be complicated at higher kα. However, a few factors mitigate this obvious discordance. First, from calculus, the first order approximation to a well-behaved function always exists so the concept of slope (in log-log space) for a narrowband function has meaning and justification. The question here would be how narrowband must an incident pulse be so as to make this a good approximation. In the higher kα regime, the "scalloping" of the transfer function is seen in FIG. 9(b), however it should be noted that for an imaging pulse at higher frequencies the walls of the cylinder become resolvable, yet the interference of the front and back wall echoes combine in the Fourier transform domain to make the interference peak and valley patterns in the transfer function. This situation requires further analysis as the matched filters will at some scale be able to resolve the front and back echoes, casting a question over how high in kα the transfer function of FIG. 9(b) can be taken at face value.

The H-scan analysis implemented as a set of matched filters is capable of distinguishing relatively small shifts in scatterer transfer functions, corresponding to small changes in size of the dominant scatterers within a region. The effects of frequency-dependent attenuation can be a confounding factor at increasing depths, however a zone approach to attenuation correction can be carried out to mitigate these effects, at least to a limited depth. These analyses can be cast into a deterministic framework whereby the types of scatterers encountered by an incident bandpass pulse have a scattering transfer function that is modeled as a power law. The general trend is for smaller structures to have higher power laws. Within natural structures of soft tissues, the power law γ will frequently lie between 0 and 2, with many important changes in tissue due to pathologies resulting in subtle shifts from baseline values.

The disclosures of each and every patent, patent application, and publication cited herein are hereby incorporated herein by reference in their entirety. While devices, systems and methods been disclosed with reference to specific embodiments, it is apparent that other embodiments and variations may be devised by others skilled in the art without departing from the true spirit and scope.

What is claimed is:

1. A method of forming an image of a region of interest using a pulse-echo imaging device, the method comprising:
   generating a pulse using the pulse-echo imaging device;
   causing the pulse to be incident on the region of interest to generate a reflected echo (e(t));
   receiving the reflected echo (e(t)) in the pulse-echo imaging device;
   convolving the received reflected echo (e(t)) to at least two matched filters, wherein each matched filter is associated with a color;
   selecting a color for display based on the convolution; and
   generating an output first image incorporating the selected color.

* * * * *